(12) United States Patent
Pfister et al.

(10) Patent No.: US 11,657,519 B2
(45) Date of Patent: May 23, 2023

(54) METHOD FOR DEFORMATION CORRECTION

(71) Applicant: Siemens Healthcare GmbH, Erlangen (DE)

(72) Inventors: Marcus Pfister, Bubenreuth (DE); Katharina Breininger, Erlangen (DE); Patrick Loeber, Erlangen (DE)

(73) Assignee: Siemens Healthcare GmbH, Erlangen (DE)

( * ) Notice: Subject to any disclaimer, the term of this patent is extended or adjusted under 35 U.S.C. 154(b) by 173 days.

(21) Appl. No.: 17/159,143

(22) Filed: Jan. 26, 2021

(65) Prior Publication Data

US 2021/0248762 A1    Aug. 12, 2021

(30) Foreign Application Priority Data

Feb. 7, 2020   (DE) .................. 10 2020 201 489.2
Feb. 17, 2020  (DE) .................. 10 2020 201 928.2

(51) Int. Cl.
*G06T 7/33* (2017.01)
*G06T 5/00* (2006.01)
*G06T 3/00* (2006.01)

(52) U.S. Cl.
CPC ............ *G06T 7/337* (2017.01); *G06T 3/0068* (2013.01); *G06T 5/006* (2013.01); *G06T 2207/20081* (2013.01)

(58) Field of Classification Search
CPC . A61B 2090/364; A61B 5/1135; A61B 5/352; A61B 5/7289; A61B 6/032;
(Continued)

(56) References Cited

U.S. PATENT DOCUMENTS 7,295,870 B2 * 11/2007 Allain .................. G06T 7/0012
                                                600/407
8,184,886 B2    5/2012 Khamene
(Continued)

FOREIGN PATENT DOCUMENTS

DE    102010041735 A1    4/2012
DE    102016212882 A1    1/2018

OTHER PUBLICATIONS

Breininger, Katharina, et al. "3D-reconstruction of stiff wires from a single monoplane X-ray image." Bildverarbeitung für die Medizin 2019. Springer Vieweg, Wiesbaden, 2019. 172-177.
Cydarmedical.com, Automated 3D overlays in the operating room, Cydar Medical, https://www.cydarmedical.com/, Stand: 2019. pp. 1-6.
(Continued)

*Primary Examiner* — Ming Wu
(74) *Attorney, Agent, or Firm* — Lempia Summerfield Katz LLC

(57) ABSTRACT

A method for deformation correction includes receiving a preoperative 3D image data set from an examination region of an examination object, generating a segmented 3D image data set by segmenting an anatomical structure in the preoperative 3D image data set, and acquiring image data from the examination region. A medical object is arranged in the examination region. The medical object is identified in the image data, and the segmented 3D image data set is registered with the image data. An overlay data set is generated and displayed based on the segmented 3D image data set and the image data. A position of a deviation between the image data and the segmented 3D image data set is defined, and a deformation rule is determined for the reduction of the deviation between the image data and the segmented 3D image data set. The corrected overlay data set is generated and provided.

20 Claims, 14 Drawing Sheets

(58) Field of Classification Search
CPC .......... A61B 6/12; A61B 6/503; A61B 6/504; A61B 6/5235; A61B 6/5247; A61B 6/527; A61B 6/5288; A61B 8/0891; A61B 8/5276; A61B 90/37; G06T 7/0012
See application file for complete search history.

(56) References Cited

U.S. PATENT DOCUMENTS

| | | | |
|---|---|---|---|
| 9,886,760 B2 | 2/2018 | Liu | |
| 2010/0226537 A1* | 9/2010 | Villain | G06T 5/50 382/103 |
| 2011/0182492 A1* | 7/2011 | Grass | A61B 6/5247 378/150 |
| 2011/0201915 A1* | 8/2011 | Gogin | A61B 5/352 600/407 |
| 2012/0082363 A1 | 4/2012 | Pfister | |
| 2018/0014884 A1 | 1/2018 | Kowarschik | |
| 2021/0030475 A1 | 2/2021 | Breininger et al. | |

OTHER PUBLICATIONS

German Office Action for German Application No. 10 2020 201 928.2 dated Oct. 13, 2020.
Koutouzi, Giasemi. Three-dimensional guidance for Endovascular Aortic Repair. 2017. pp. 1-87.
Penney, G. P., et al. "Deforming a preoperative vol. to represent the intraoperative scene" Computer Aided Surgery 7.2 (2002): 63-73.
Pfister Marcus Dr. "Determining and taking account of calcifications in the visualization and deformation of segmentation meshes" pp. 1-2.
Roy, David, et al. "Finite element analysis of abdominal aortic aneurysms: geometrical and structural reconstruction with application of an anisotropic material model." The IMA Journal of Applied Mathematics 79.5 (2014): 1011-1026.
Toth, Daniel, et al. "Adaption of 3D models to 2D x-ray images during endovascular abdominal aneurysm repair." International Conference on Medical Image Computing and Computer-Assisted Intervention. Springer, Cham, 2015. pp. 1-8.

* cited by examiner

METHOD FOR DEFORMATION CORRECTION

This application claims the benefit of German Patent Application No. 10 2020 201 489.2, filed on Feb. 7, 2020, and German Patent Application No. 10 2020 201 928.2, filed on Feb. 17, 2020, which are hereby incorporated by reference in their entirety.

BACKGROUND

The present embodiments relate to deformation correction.

Medical objects (e.g., a guide wire and/or a catheter) are frequently introduced into a vessel in the treatment and/or examination of changes in vessels of an examination object. For real-time monitoring of the medical object in the vessel using imaging, projection X-ray images are frequently acquired with the application of contrast medium (e.g., iodine-containing contrast medium). A reduction in the contrast medium to be applied may often be achieved in this case by way of registering and subsequent overlaying of a preoperatively acquired image data set with one of the projection X-ray images.

One drawback in this case, however, is that a deformation of the vessel and surrounding tissue may occur due to the arrangement of the medical object in the vessel. The deformation is not mapped in the preoperative image data set. For correction of the deformation in the preoperative image data set, a deformation model that is based on a material parameter of the medical object, and/or a time-consuming manual adjustment based on a plurality of projection X-ray images that were acquired with the application of contrast medium is frequently used. The correction of the preoperative image data set is frequently insufficient (e.g., at orifices and/or vessel bifurcations).

SUMMARY AND DESCRIPTION

The scope of the present invention is defined solely by the appended claims and is not affected to any degree by the statements within this summary.

The present embodiments may obviate one or more of the drawbacks or limitations in the related art. For example, an improved representation of an anatomical structure and of a medical object arranged therein is enabled.

The present embodiments are described below both in relation to methods for deformation correction as well as in relation to methods and devices for providing a trained function and methods and devices for providing a further trained function. Features, advantages, and alternative embodiments of data structures and/or functions in the case of methods for deformation correction may be transferred to analogous data structures and/or functions in methods and devices for providing a trained function and methods and devices for providing a further trained function. Analogous data structures may be identified, for example, by the use of the prefix "training". Further, the trained functions used in methods for deformation correction may have been adjusted and/or provided, for example, by methods and devices for providing a trained function and/or by methods for providing a further trained function.

In a first aspect, the present embodiments relate to a method for deformation correction. In a first act a), a preoperative three-dimensional image data set (e.g., 3D image data set) is received from an examination region of an examination object. Further, in a second act b), a segmented 3D image data set is generated by segmenting the at least one anatomical structure in the preoperative 3D image data set. In addition, in a third act, image data is acquired (e.g., intraoperatively) from the examination region. A medical object is arranged in the examination region in this case. In a fourth act d), mapping of the medical object is identified in the image data. Further, the segmented 3D image data set is registered with the image data in a fifth act e). Hereafter, in a sixth act f.1), an overlay data set is generated based on the segmented 3D image data set and the image data. Further, in a seventh act f.2), a visual representation of the overlay data set is displayed by a display unit. Further, in an eighth act f.3), a position of a deviation between the image data and the segmented 3D image data set is defined in the visual representation of the overlay data set. Hereafter, in a ninth act f.4), a deformation rule is determined based on the defined position of the deviation and the identified mapping of the medical object such that the deviation between the image data and the segmented 3D image data set is reduced. In a tenth act f.5), a corrected overlay data set is generated by applying the deformation rule to the segmented 3D image data set. Hereafter, the corrected overlay data set is provided in an eleventh act f.6).

The above-described acts may be carried out successively and/or at least partially at the same time.

Receiving the preoperative 3D image data set from the examination region of the examination object in act a) may include, for example, capturing and/or reading a computer-readable data memory and/or receiving from a data memory unit (e.g., a database). Further, the preoperative 3D image data set may be provided by a provision unit of a first medical imaging device.

Further, the preoperative 3D image data set may have a plurality of image points (e.g., voxels). In one embodiment, the preoperative 3D image data set may map a spatial volume of the examination region of the examination object preoperatively in a three-dimensional manner. The examination object may be, for example, a human and/or animal patient and/or an examination phantom. The preoperative 3D image data set may be acquired, for example, by the first medical imaging device (e.g., a computed tomography system (CT) and/or a magnetic resonance system (MRT) and/or a medical X-ray apparatus and/or a sonography system and/or a positron emission tomography system (PET)). Further, the preoperative 3D image data set may have metadata, where the metadata may include, for example, information relating to an acquisition parameter and/or operating parameter of the first medical imaging device.

The segmented 3D image data set may be generated by segmenting at least one anatomical structure (e.g., an organ and/or a tissue and/or a tissue boundary and/or a vessel, such as a vessel section) in the preoperative 3D image data set. Segmenting of the at least one anatomical structure may include applying an algorithm for pattern recognition and/or for identification of anatomical structures to the preoperative 3D image data set. Alternatively or in addition, segmenting of the at least one anatomical structure may be based on image values (e.g., image intensity values and/or image contrast values) in the 3D image data set. The at least one anatomical structure may be segmented, for example, in the preoperative 3D image data set by a comparison of the image values of the preoperative 3D image data set with a predetermined image value interval and/or a predetermined threshold value. In one embodiment, fields of view that do not map the at least one anatomical structure are omitted and/or filtered out from the segmented 3D image data set by the segmenting. For example, the preoperative 3D image data set may map the examination region by application of a contrast medium (e.g., an X-ray-opaque one). In one embodiment, the at least one anatomical structure may have a defined image contrast value and/or image intensity value in the preoperative 3D image data set. Further, the segmented 3D image data set may have a three-dimensional (e.g., isolated) mapping of the at least one anatomical structure. The anatomical structure may be, for example, a vessel (e.g., a blood vessel) and/or a vessel section and/or a vascular tree and/or a hollow organ.

The image data may be acquired from the examination region of the examination object in act c) (e.g., intraoperatively) using a medical imaging device. The medical imaging device may be the first medical imaging device or be different from this. For example, the medical imaging device may be configured as a computed tomography system (CT) and/or magnetic resonance system (MRT) and/or medical X-ray apparatus and/or sonography system and/or positron emission tomography system (PET). The image data may have at least one two-dimensional and/or three-dimensional mapping of the examination region. For example, the image data may have a time-resolved mapping of the examination region, where a movement of the medical object within the examination region may be mapped in the image data. The medical object may be configured, for example, as a guide wire and/or catheter and/or endoscope and/or laparoscope and/or implant. Further, the medical object may be arranged in the at least one anatomical structure. In one embodiment, positioning and/or movement of the medical object may be monitored by the image data via imaging. Further, in one embodiment, the image data may map at least part of the at least one anatomical structure (e.g., in a time-resolved manner). The image data may map the examination region (e.g., at least part of the at least one anatomical structure) by application of a contrast medium (e.g., an X-ray-opaque contrast medium). In one embodiment, the image data may map the examination region having at least part of the least one anatomical structure and having the medical object (e.g., in a time-resolved manner), therefore.

Further, the image data may have a plurality of image points (e.g., pixels and/or voxels). Identifying the mapping of the medical object in the image data can include, for example, a localization and/or segmenting of the image points that map the medical object. Identifying the mapping of the medical object may take place, for example, using a form (e.g., a contour) and/or a structure (e.g., a marker structure on the medical object) and/or based on image values of the image points. If the image data includes a time-resolved mapping of the examination region, then, for example, the medical object may be identified using a mapping of a movement of the medical object and/or a physiological movement (e.g., relative movement) of surrounding anatomical regions in the image data. For example, mapping of the medical object may be identified using time intensity curves of the image points of the image data.

Registering the segmented 3D image data set with the image data may include (e.g., a rigid and/or non-rigid transformation of the image data and/or of the segmented 3D image data set). For example, registering may include a rotation and/or scaling and/or deformation of the image data and/or of the segmented 3D image data set. If the image data is two-dimensional, the two-dimensional image data may be registered with a two-dimensional slice of the segmented 3D image data set. In one embodiment, registering the segmented 3D image data set with the image data may be based on anatomical features and/or geometric features and/or the metadata.

In act f.1), the overlay data set may be generated based on the segmented 3D image data set and the image data. In one embodiment, generating the overlay data set may include an overlaying (e.g., weighted and/or adaptive) of the image data and of the segmented 3D image data set. Further, the overlay data set may be at least two-dimensional. In one embodiment, the overlay data set includes the mapping (e.g., preoperative) of the at least one anatomical structure contained in the segmented 3D image data set and the mapping of the examination region in the image data, acquired, for example, intraoperatively. Further, for the generation of the overlay data set, a projection (e.g., a two-dimensional projection) of the segmented 3D image data set may be generated along a specified projection direction. In one embodiment, the overlay data set may include an overlaying (e.g., weighted and/or adaptive) of the image data with the projection of the segmented 3D image data set. This is advantageous, for example, with two-dimensional image data that has a projection mapping of the examination region. The projection direction may be specified as a function of (e.g., parallel to) a projection direction for the acquisition of the image data.

In one embodiment, a visual representation of the overlay data set (e.g., two-dimensional) may be generated in act f.2). In one embodiment, the visual representation of the overlay data set may be generated such that the respective portions of the image data and of the segmented 3D image data set may be differentiated (e.g., visually). In addition, the visual representation of the overlay data set may be displayed by the display unit. The visual representation of the overlay data set may be visually detected by a user hereby. In one embodiment, the display unit may be configured as a screen and/or monitor and/or projector.

The deviation between the image data and the segmented 3D image data set in the visual representation of the overlay data set may be caused, for example, by inadequate and/or erroneous registering. In one embodiment, the deviation may describe a misalignment and/or incorrect positioning (e.g., incorrect arrangement) of anatomical and/or geometric features of the image data and of the segmented 3D image data set in the visual representation of the overlay data set. For example, at least part of the at least one anatomical structure may be mapped several times in the visual representation of the overlay data set by overlaying the image data with the segmented 3D image data set in act f.1). In one embodiment, the deviation may be localized hereby. In one embodiment, the position of the deviation may include a spatial position of at least one image point of the visual representation of the overlay data set, with the mapping of the at least one anatomical structure differing in the at least one image point between the portion of the image data and the portion of the segmented 3D image data set.

In one embodiment, the position of the deviation in the visual representation of the overlay data set may be defined by application of an algorithm for the localization of deviations and/or by a user input. The algorithm for the localization of deviations may be configured, for example, to perform a pattern recognition (e.g., a recognition of anatomical and/or geometric features) in the visual representation of the overlay data set. For example, the algorithm for the localization of deviations may be configured to compare the geometric and/or anatomical features of the portion of the image data and of the portion of the segmented 3D image data set, respectively with each other, and to localize a deviation that occurs so as to be accurate to an image point. The portion are overlaid in the visual representation of the overlay data set.

In one embodiment, the deformation rule determined in act f.4) may have information on the rigid and/or non-rigid transformation (e.g., deformation) of the segmented 3D image data set. In one embodiment, determining the deformation rule may include an, optimization (e.g., a cost-minimizing optimization), with the deviation, which has a position defined in the visual representation in act f.3), being minimized by applying the deformation rule to the segmented 3D image data set. The optimization may be based, for example, on a cost function, with the cost function being determined as a function of the deviation defined in act f.3).

In one embodiment, the deformation rule may be determined in act f.4) such that in fields of view of the visual representation of the overlay data set aside from the position of the deviation, no deterioration occurs with respect to registering between the overlaying of the image data with the segmented 3D image data set. The position of the deviation defined in act f.3) may be considered, for example, as a boundary condition, for determination of the deformation rule. Alternatively or in addition, at least one further anatomical structure (e.g., access into a femoral artery), a region of an aortic valve, and/or a proximal section of an aorta descendens may be specified as the deformation-invariant fixed point for determination of the deformation rule.

In one embodiment, generating the corrected overlay data set in act f.5) may include applying the deformation rule determined in act f.4) to the segmented 3D image data set. In one embodiment, a corrected 3D image data set may be provided in this case. Hereafter, the corrected overlay data set may be generated by an overlaying (e.g., weighted and/or adaptive) of the image data with the corrected 3D image data set (e.g., analogously to act f.1)). In one embodiment, the corrected overlay data set has, at least at the position defined in act f.3), a smaller deviation between the image data and the corrected 3D image data set than that of the overlay data set. Acts f.4) and f.5) may be used, for example, as a deformation correction of the segmented 3D image data set.

Further, providing the corrected overlay data set in act f.6) may include, for example, storage on a computer-readable storage medium and/or display on the display unit and/or transfer to a provision unit. For example, a visual representation of the corrected overlay data set may be displayed on the display unit.

The method of one or more of the present embodiments enables a particularly intuitive and direct correction possibility for the adjustment and improvement of a deformation correction. In one embodiment, the method of one or more of the present embodiments may be used to assist a user (e.g., a medical operator).

According to a further embodiment of the method for deformation correction, the deformation rule may be determined in act f.4) along a longitudinal extension direction of the medical object and/or the at least one anatomical structure. For example, with a design of the medical object as a catheter and/or guide wire, a deformation of the at least one anatomical structure, in which or on which the medical object is arranged, may occur substantially along the longitudinal extension direction (e.g., along a longitudinal axis or a central line) of the medical object and/or the at least one anatomical structure. For example, the longitudinal extension direction of the medical object and/or the at least one anatomical structure may run in a curved manner. The deformation of the at least one anatomical structure may include, for example, a compression and/or stretching (e.g., along the longitudinal extension direction). This may result in a deviation between the segmented 3D image data set, which is based on the preoperative 3D image data set, and the, for example, intraoperatively acquired image data. In one embodiment, the deformation rule may be determined such that by applying the deformation rule to the segmented 3D image data set in act f.5), the deformation of the at least one anatomical structure, at least along the longitudinal extension direction of the medical object arranged intraoperatively therein or thereon and/or along the longitudinal extension direction of the at least one anatomical structure is corrected (e.g., one-dimensionally).

In one embodiment, the deformation rule may be adjusted by a user input using the input unit such that an effect of the deformation rule along the longitudinal extension direction on application to the segmented 3D image data set may be adjusted linearly and/or non-linearly by the input. For example, the compression and/or stretching of the deformation of the segmented 3D image data set along the longitudinal extension direction may be adjusted based on the user input. Alternatively or in addition, the deformation rule for correction of the deformation of the at least one anatomical structure may have a rotation rule for the rotation of at least part of the segmented 3D image data set around the longitudinal extension direction of the medical object and/or the at least one anatomical structure (e.g., around the central line). In one embodiment, the rotation rule may be adjusted by a further user input using the input unit.

In a further embodiment of the method for deformation correction, the method may be carried out repeatedly beginning from act f.2) for the generation of the corrected overlay data set through to the occurrence of a termination condition. The corrected overlay data set may be provided as an overlay data set in act f.2)

In one embodiment, the termination condition may be based on a threshold value and/or a confidence value of registering in act f.1) and/or the deformation correction in act f.5) and/or on an image quality value with respect to the deviation determined in act f.3), and/or a maximum number of repetitions. Alternatively or in addition, the confidence value and/or the image quality value may be input by a user using the input unit.

In one embodiment, a particularly precise and, at the same time, intuitive deformation correction may be enabled hereby on generation of the corrected overlay data set.

In a further embodiment of the method for deformation correction, the segmented 3D image data set may be generated having a deformable model of the at least one anatomical structure. The deformation rule may be applied in act f.5) to the deformable model.

The deformable model may be configured, for example, as a volume mesh model. Alternatively or in addition, the deformable model may have, for example, a central line and/or an item of cross-section information (e.g., a radius and/or a cross-sectional area) that have at least one anatomical structure. In one embodiment, a surface and/or boundary surface and/or characteristic structure of the at least one anatomical structure may be mapped in the deformable model. For this, act b) may also include an adjustment of the deformable model to the at least one anatomical structure (e.g., based on image values of the preoperative and/or segmented 3D image data set). Further, the deformation rule determined in act f.5) may be applied to the deformable model such that the deformable model is rigidly and/or non-rigidly deformed. In one embodiment, the segmented 3D image data set may be rigidly and/or non-rigidly deformable as a function of the deformable model. For example, partial volume effects in the image points of the segmented 3D image data set may be reduced by the application of the deformation rule to the deformable model and the downstream deformation of the segmented 3D image data set as a function of the deformable model. In one embodiment, the corrected 3D image data set may be generated in act f.5) by a regridding after application of the deformation rule. Further, the deformation of the at least one anatomical structure due to the medical object arranged therein or thereon may be taken into account particularly precisely on application of the deformation correction to the deformable model. For example, the deformable model may include at least one item of information relating to a deformability and/or a physiological parameter of the at least one anatomical structure. Consequently, the segmented 3D image data set and the visual representation of the overlay data set may be corrected of deformations.

In one embodiment, a corrected model may be generated in act f.5) by the application of the deformation rule to the deformable model. In one embodiment, the deviation between the image data and the segmented 3D image data set in the visual representation of the overlay data set may be indirectly determined between the image data and the deformable model. For this, for example, a position corresponding with the position of the deviation defined in the visual representation may be determined on the deformable model. Further, a change in the position of the deviation due to application of the deformation rule to the deformable model may be simulated and/or predetermined on the deformable model by the change in the position corresponding therewith.

In one embodiment, the adjustment of the deformable model to the at least one anatomical structure in act b) may provide that the at least one anatomical structure is maintained even on application of the deformation rule to the segmented 3D image data set (e.g., the deformable model). For the determination of the deformation rule in act f.4), a boundary condition (e.g., an anatomical boundary condition) may be specified, moreover, with respect to the deformability of the at least one anatomical structure.

In a further embodiment of the method for deformation correction, act e) may also include an adjustment of the deformable model in the segmented 3D image data set. The deformation of the deformable model of the at least one anatomical structure may hereby already be taken into account for registering the segmented 3D image data set with the image data (e.g., based on geometric and/or anatomical image features of the respective original data). For example, in addition to feature-based registering, a deformation of the at least one anatomical structure by the medical object arranged therein or thereon may be taken into account.

In a further embodiment of the method for deformation correction, generation of the segmented 3D image data set may include an annotation of at least one reference landmark on the at least one anatomical structure in the segmented 3D image data set. The at least one reference landmark may be, for example, an anatomical reference landmark. Further, the at least one reference landmark may mark a spatial position in the segmented 3D image data set with respect to the at least one anatomical structure. In one embodiment, the at least one reference landmark may mark a position of an anatomical characteristic (e.g., an orifice and/or bifurcation) of the at least one anatomical structure. In one embodiment, the annotation of the at least one reference landmark may take place manually (e.g., via a user input using an input unit) and/or semi-automatically and/or automatically. For example, annotated reference landmarks relating to the segmented 3D image data set may be received. Alternatively or in addition, the at least one reference landmark may be identified and annotated using a form (e.g., a contour) and/or an image contrast value (e.g., a contrast characteristic) and/or an image intensity value (e.g., corresponding with a contrast medium) and/or a marker structure (e.g., on the at least one anatomical structure). A semi-automatic and/or automatic annotation of the at least one reference landmark may take place, for example, by applying an algorithm for pattern recognition to the segmented 3D image data set and/or based on an anatomy atlas. The annotation of the at least one reference landmark can include, for example, defining and/or marking a spatial position on the at least one anatomical structure, with the at least one anatomical structure having an anatomical characteristic at the respective spatial position.

For example, the visual representation of the overlay data set may have a visual representation of the at least one reference landmark. In one embodiment, the position of the deviation may be detected and defined particularly intuitively hereby.

In a further embodiment of the method for deformation correction, act f.3) may also include determination of a corresponding at least one landmark in the segmented 3D image data set based on the defined position of the deviation.

In one embodiment, the corresponding at least one landmark may be determined by a back projection, starting from the position of the deviation in the visual representation of the overlay data set, to the segmented 3D image data set. In one embodiment, the corresponding at least one landmark may be determined manually and/or semi-automatically and/or automatically. For example, the corresponding at least one landmark may be an anatomical landmark on the at least one anatomical structure, which with respect to further anatomical landmarks, has the shortest spatial distance in relation to a direction of the back projection starting from the position of the deviation. Alternatively or in addition, an algorithm for pattern recognition may be applied to the segmented 3D image data set for determination of the corresponding at least one landmark.

Further, a deformation of the corresponding at least one landmark in the segmented 3D image data set may be taken into account on determination and/or application of the deformation rule in act f.4) or f.5), respectively. In one embodiment, the correspondence between the position of the deviation and the corresponding at least one landmark may be taken into account as a boundary condition on determination of the deformation rule in act f.4).

In a further embodiment of the method for deformation correction, at least one of the at least one reference landmark may be determined as the corresponding at least one landmark. In one embodiment, one or more reference landmarks of the at least one reference landmark may be determined as the corresponding at least one landmark. The one or more reference landmarks have the shortest spatial distance in relation to the direction of the back projection starting from the position of the deviation. Alternatively or in addition, a plurality of the at least one reference landmark may be determined as the corresponding at least one landmark (e.g., when a plurality of reference landmarks are arranged within a specified spatial distance to the direction of the back projection in the segmented 3D image data set).

In a further embodiment of the method for deformation correction, act f.3) may also include an identification of at least one (e.g., anatomical) landmark in the visual representation of the overlay data set based on the defined position of the deviation. The corresponding at least one landmark may be determined based on the at least one landmark.

The landmark may be identified in the visual representation of the overlay data set, for example, using a form (e.g., a contour), and/or an image contrast value (e.g., a contrast characteristic), and/or an image intensity value (e.g., corresponding with a contrast medium), and/or a marker structure (e.g., on the medical object and/or on the at least one anatomical structure). Alternatively or in addition, the at least one landmark may be a visual representation of the at least one reference landmark from the segmented 3D image data set. In addition, the at least one landmark of the at least anatomical structure may be determined manually and/or automatically and/or semi-automatically (e.g., by annotation) based on the position of the deviation in the visual representation of the overlay data set. For example, the position of the deviation may identify an image point that has the landmark (e.g., a mapping of the landmark). Alternatively or in addition, the landmark may be identified in a field of view of the visual representation of the overlay data set around the position of the deviation.

In one embodiment, in act f.4), the at least one landmark corresponding with the at least one landmark in the visual representation of the overlay data set may be determined in the segmented 3D image data set. In one embodiment, the corresponding at least one landmark may be determined by a back projection, starting from the at least one landmark in the visual representation of the overlay data set, to the segmented 3D image data set. If the at least one landmark in the visual representation of the overlay data set includes at least two image points (e.g., a contour and/or surface), the at least one landmark corresponding therewith may be determined in the segmented 3D image data set particularly reliably. Alternatively or in addition, an algorithm for pattern recognition may be applied to the segmented 3D image data set for determination of the corresponding at least one landmark. In one embodiment, a position corresponding with the position of the deviation defined in act f.3) may be determined in the segmented 3D image data set by determination of the correspondence between the at least one landmark in the visual representation of the overlay data set and the at least one landmark corresponding therewith in the segmented 3D image data set. In one embodiment, the at least one landmark in the visual representation of the overlay data set has two-dimensional positioning while the at least one landmark corresponding therewith in the segmented 3D image data set has three-dimensional positioning.

Further, one or more reference landmarks of the at least one reference landmark may be determined as the corresponding at least one landmark based on the at least one landmark. This is advantageous, for example, when the at least one landmark is a visual representation of the at least one reference landmark. In this case, the correspondence between the visual representation of the at least one reference landmark and the at least one reference landmark corresponding therewith in the segmented 3D image data set is known.

Further, a deformation of the corresponding at least one landmark in the segmented 3D image data set may be taken into account on determination and/or application of the deformation rule in act f.4) or act f.5), respectively. For example, the deformation rule may be determined in act f.4) such that the deviation between the at least one landmark in the visual representation of the overlay data set and a projection of the at least one landmark of the corrected 3D image data set corresponding therewith is minimized. In one embodiment, the correspondence between the at least one landmark and the at least one landmark corresponding therewith may be taken into account as the boundary condition on determination of the deformation rule in act f.4).

In a further embodiment of the method for deformation correction, the position of the deviation may define a target position for the determination of the deformation rule in act f.4). The segmented 3D image data set (e.g., a mapping of the segmented 3D image data set in the overlay data set) may be deformed at least partially in the direction of the target position for generating the corrected overlay data set in act f.5). In one embodiment, the target position may be defined based on a geometric and/or anatomical feature of the visual representation of the overlay data set. For example, the target position may be defined based on a portion of the image data in the visual representation of the overlay data set. In one embodiment, the target position may mark a position of a contour and/or anatomical landmark in the visual representation of the overlay data set (e.g., the portion of the image data). In one embodiment, the deformation rule may be determined based on the target position such that at least part (e.g., a section) of the segmented 3D image data set is deformed when applying the deformation rule. For example, the at least one landmark and/or the corresponding at least one landmark may be determined based on the target position.

In a further embodiment of the method for deformation correction, the deformation rule may be determined such that the at least one landmark in the visual representation of the overlay data set is deformed in the direction of the target position. In one embodiment, it is possible for a user to detect the deformation correction directly and intuitively via a visual representation of the corrected overlay data set hereby.

In a further embodiment of the method for deformation correction, identification of the at least one landmark in the visual representation of the overlay data set and the at least one landmark corresponding therewith in the segmented 3D image data set may take place by applying a trained function to input data. The input data may be based on the defined position of the deviation, the visual representation of the overlay data set, the segmented 3D image data set, and the image data. Further, at least one parameter of the trained function may be based on a comparison of at least one training landmark with at least one comparison landmark and a comparison of the at least one training and comparison landmark corresponding therewith, respectively.

In one embodiment, the trained function may be trained by a method of machine learning. For example, the trained function may be a neural network (e.g., a convolutional neural network (CNN) or a network including a convolutional layer).

The trained function maps input data onto output data. For example, the output data may also depend, for example, on one or more parameters of the trained function. The one or more parameters of the trained function may be determined and/or adjusted by training. Determining and/or adjusting the one or more parameters of the trained function may be based, for example, on a pair of training input data and associated training output data, with the trained function being applied to the training input data for the generation of training mapping data. For example, determining and/or adjusting may be based on a comparison of the training mapping data with the training output data. In general, a trainable function (e.g., a function with one or more parameter(s) that have not yet been adjusted) is also referred to as a trained function.

Other terms for trained function are trained mapping rule, mapping rule with trained parameters, function with trained parameters, algorithm based on artificial intelligence, and algorithm of machine learning. One example of a trained function is an artificial neural network, where the edge weights of the artificial neural network correspond to the parameters of the trained function. Instead of the term "neural network", the term "neuronal network" may also be used. For example, a trained function may also be a deep artificial neural network (e.g., deep neural network). A further example of a trained function is a "Support Vector Machine". For example, other algorithms of machine learning may also be used as the trained function.

The trained function may be trained, for example, by a back propagation. First, training mapping data may be determined by application of the trained function to training input data. Hereafter, a deviation may be determined between the training mapping data and the training output data by application of an error function to the training mapping data and the training output data. Further, at least one parameter (e.g., a weighting) of the trained function (e.g., of the neural network) may be iteratively adjusted based on a gradient of the error function with respect to the at least one parameter of the trained function. In one embodiment, the deviation between the training mapping data and the training output data during training of the trained function may be minimized hereby.

In one embodiment, the trained function (e.g., the neural network) has an input layer and an output layer. The input layer may also be configured for receiving input data. Further, the output layer may be configured for providing mapping data. The input layer and/or the output layer may each include a plurality of channels (e.g., neurons).

In one embodiment, at least one parameter of the trained function may be based on a comparison of the at least one training landmark with the at least one comparison landmark and a comparison of the at least one training and comparison landmark corresponding therewith, respectively. In one embodiment, the at least one training landmark, the at least one comparison landmark, and the at least one training and comparison landmark corresponding therewith, respectively, may be determined as part of a computer-implemented method for providing a trained function, which will be explained in the further course of the description. For example, the trained function may be provided by an embodiment of the computer-implemented method for providing a trained function.

In one embodiment, the input data of the trained function may be based on the position of the deviation defined in act f.3), the visual representation of the overlay data set, the segmented 3D image data set, and the image data. In one embodiment, the at least one landmark and the at least one landmark corresponding therewith may be identified particularly reliably and robustly by application of the trained function.

In a further embodiment of the method, the position of the deviation may be defined in act f.3) by a user input using an input unit.

The position of the deviation may be defined by the user input using an input unit (e.g., a pointing device, such as a computer mouse and/or a joystick, and/or a stylus and/or a keyboard) and/or using gesture control. Further, the input unit may be integrated in the display unit, for example, as a capacitive input display. In one embodiment, the user may select the image point that corresponds with the deviation in the visual representation of the overlay data set and/or mark a field of view comprising a plurality of image points, with the field of view at least partially having the deviation. For example, the position of the deviation may be received, for example, based on the user input. Receiving the position of the deviation may include, for example, capturing and/or reading a computer-readable data memory and/or receiving from a data memory unit (e.g., a database).

This may enable particularly intuitive and user-oriented defining of the position of the deviation in act f.3).

In a further embodiment of the method, the overlay data set may have distance information relating to the deviation between the segmented 3D image data set and the image data. Further, the position of the deviation may also be defined in act f.3) based on the distance information.

The distance information may have, for example, a vector field (e.g., a two-dimensional vector field), with the deviation between the segmented 3D image data set (e.g., a projection of the segmented 3D image data set) and the image data being mapped by the vector field (e.g., image point by image point). The distance information may map, for example, a correspondence between the image points of the segmented 3D image data set (e.g., the projection of the segmented 3D image data set) and the image points of the image data. Further, the visual representation of the overlay data set may include a visual representation of the distance information (e.g., by displaying a label and/or an overlaying (e.g., weighted and/or adaptive) of the overlay data set with the distance information (e.g., two-dimensional distance information).

This may enable particularly simple detection of a deviation between the segmented 3D image data set and the image data using the visual representation of the overlay data set.

In a further embodiment of the method for deformation correction, act f.4) may include determining a position in the segmented 3D image data set corresponding with the defined position of the deviation by a back projection.

In one embodiment, the defined position of the deviation may be back-projected in the visual representation of the overlay data set advantageously to the segmented 3D image data set. In one embodiment, the back projection direction may run anti-parallel to the projection direction for the projection of the segmented 3D image data set on generation of the overlay data set. In one embodiment, the corresponding position of the deviation in the segmented 3D image data set may lie on a spatial axis, which runs parallel to the back projection direction through a focal point of the projection. If the image data has two-dimensional projection mapping of the examination region, the focal point may correspond, for example, to the focal point of the projection mapping (e.g., an X-ray projection). The corresponding position along the back projection direction may be determined, for example, as an intersection with the at least one anatomical structure that is contained in the segmented 3D image data set. Alternatively or in addition, the corresponding position along the back projection direction may be determined as the intersection with the deformable model of the at least one anatomical structure (e.g., a volume network model and/or a central line).

Further, the back projection direction determined using the defined position of the deviation may be taken into account as a boundary condition for the determination of the deformation rule in act f.4).

In a further embodiment of the method for deformation correction, the position of the deviation may define a target position. The corresponding position may define a corresponding target position in the segmented 3D image data set. In addition, the deformation rule may be determined such that at least part of the segmented 3D image data set (e.g., the deformable model) is deformed in the direction of the corresponding target position.

In one embodiment, the corresponding target position may define a spatial position in the segmented 3D image data set. This enables a particularly precise and, for example, anatomically correct deformation correction. Further, the deformation rule may be determined such that the corresponding at least one landmark is deformed in the direction of the corresponding target position. Further, the deformation rule may be determined such that the corresponding at least one landmark (e.g., at least one of the at least one reference landmark) is deformed in the direction of the corresponding target position when applying the deformation rule to the segmented 3D image data set. The landmark in the visual representation of the overlay data set is also deformed in the direction of the target position hereby.

In a further embodiment of the method for deformation correction, the deformation rule may be determined in act f.4) also based on a material property of the medical object and/or an operating parameter of the medical object and/or a form of the medical object and/or a tissue parameter of the examination object and/or a physiological parameter of the examination object.

If a plurality of medical objects is arranged in the examination region, which is mapped in the image data, at least the operating parameter and/or the material property and/or the form of the medical object may be taken into account on determination of the deformation rule, which, for example, is spatially closest to the position in the image data defined in act f.3) and consequently mapped in the visual representation of the overlay data set. In one embodiment, the deformation rule may be determined such that the deformation rule includes a deformation (e.g., a compression and/or stretching) of the at least one anatomical structure by the medical object arranged therein or thereon. The material property of the medical object may have, for example, information on the pliability and/or distortion capacity and/or on a surface quality of the medical object. Further, the operating parameter of the medical object may have, for example, information on the direction of movement and/or spatial position and/or movement speed of at least part of the medical object. The tissue parameter of the examination object may have, for example, information on the deformability (e.g., elasticity) of the at least one anatomical structure and/or adjoining tissue inside the examination region. In one embodiment, calcifications in the at least one anatomical structure may be taken into account hereby on determination of the deformation rule. Further, the physiological parameter of the examination object may have, for example, information on a phase of the breathing and/or the heartbeat of the examination object (e.g., at the instant of acquisition of the image data). This may enable improved determination of the deformation rule for the adjustment of the segmented 3D image data set to the image data.

In a further embodiment of the method for deformation correction, the corrected overlay data set may be generated by application of a further trained function to further input data. In one embodiment, the further input data may be based on the defined position of the deviation, the segmented 3D image data set, and the image data. Further, at least one parameter of the further trained function may be based on a comparison of a corrected training overlay data set with a corrected comparison overlay data set.

The advantages and properties of the further trained function described above substantially match the advantages and properties of the trained function. The features, advantages, or alternative embodiments mentioned in relation to the trained function may likewise be transferred to the further trained function, and vice versa.

In one embodiment, at least one parameter of the further trained function may be based on a comparison of the corrected training overlay data set with the corrected comparison overlay data set. In one embodiment, the corrected training overlay data set and the corrected comparison overlay data set may be determined as part of a computer-implemented method of one or more of the present embodiments for providing a further trained function, which will be explained in the further course of the description. For example, the further trained function may be provided by an embodiment of the proposed computer-implemented method for providing a further trained function.

This may enable particularly intuitive and rapid deformation correction.

The present embodiments relate to, in a second aspect, a method (e.g., a computer-implemented method) for providing a trained function. A preoperative 3D training image data set is received from an examination region of an examination object in a first act t.1). Further, in a second act t.2), a segmented 3D training image data set is generated by segmenting at least one anatomical structure in the preoperative 3D training image data set. In addition training image data (e.g., intraoperative) is received from the examination region in a third act t.3), where a medical object is arranged in the examination region. Further, the segmented 3D training image data set is registered with the training image data in a fourth act t.4). Hereafter, a training overlay data set is generated based on the segmented 3D training image data set and the training image data in a fifth act t.5). Further, a visual training representation of the training overlay data set is generated in a sixth act t.6). A training position of a deviation between the training image data and the segmented 3D training image data set is defined in the visual training representation of the training overlay data set in a seventh act t.7). Further, at least one comparison landmark is identified in an eighth act t.8) in the visual training representation of the training overlay data set based on the defined training position of the deviation. In addition, an at least one comparison landmark corresponding with the at least one comparison landmark is determined in the segmented 3D training image data set in a ninth act t.9). Further, at least one training landmark is identified in a tenth act t.10) in the visual training representation of the training overlay data set and an at least one training landmark corresponding therewith in the segmented 3D training image data set by application of the trained function to input data. The input data of the trained function is based on the defined training position of the deviation, the visual training representation of the training overlay data set, the segmented 3D training image data set, and the training image data. Hereafter, in an eleventh act t.11), at least one parameter of the trained function is adjusted based on a comparison of the at least one training landmark with the at least one comparison landmark and a comparison of the training and comparison landmark corresponding therewith, respectively. Further, the trained function is provided in a twelfth act t.12).

Receiving the preoperative 3D training image data set and/or the training image data from the examination region of the examination object may include, for example, capturing and/or reading a computer-readable data memory and/or receiving from a data memory unit (e.g., a database). Further, the preoperative 3D training image data set and/or the training image data may be provided by a provision unit of a medical imaging device.

The preoperative 3D training image data set may have, for example, all properties of the preoperative 3D image data set that were described in relation to the method for deformation correction, and vice versa. Further, the training image data may have all properties of the image data that were described in relation to the method for deformation correction, and vice versa. For example, the preoperative 3D training image data set may be a preoperative 3D image data set. Analogously thereto, the training image data may be image data. Further, the preoperative 3D training image data set and/or the training image data may be simulated.

In one embodiment, the medical object (e.g., a guide wire and/or a catheter and/or an endoscope and/or a laparoscope and/or an implant, such as a stent), which is arranged in the examination region of the examination object, may be mapped in the at least one training X-ray image.

The medical object described here, which is mapped in the training image data, may be similar to or different from the medical object mapped in the image data, which was described in relation to the method for deformation correction, and vice versa. Analogously thereto, the examination object and/or the examination region, in which the medical object is arranged and which is mapped in the preoperative 3D training image data set and/or the training image data, is the same as or different from the examination object and/or examination region, which was described in relation to the method for deformation correction, and vice versa.

The segmented 3D training image data set may be generated analogously to generating the segmented 3D image data set in act b) of the method for deformation correction. The segmented 3D training image data set may have, for example, all properties of the segmented 3D image data set, which were described in relation to the method for deformation correction, and vice versa.

In one embodiment, the acts t.4) to t.7) may each take place analogously to acts e) to f.3) of the method for deformation correction.

Further, the comparison landmark may be identified in the visual training representation of the training overlay data set, for example, using a form (e.g., a contour), and/or an image contrast value (e.g., a contrast characteristic), and/or an image intensity value (e.g., corresponding with a contrast medium), and/or a marker structure (e.g., on the medical object and/or on the at least one anatomical structure). In one embodiment, the comparison landmark of the at least anatomical structure may be determined automatically and/or semi-automatically (e.g., by annotation) based on the training position of the deviation in the visual training representation of the training overlay data set. For example, the training position of the deviation may identify an image point that has the comparison landmark (e.g., a mapping of the comparison landmark). Alternatively or in addition, the comparison landmark may be identified in a field of view of the visual training representation of the training overlay data set around the training position of the deviation.

In one embodiment, in act t.9), an at least one comparison landmark corresponding with the at least one comparison landmark in the visual training representation of the training overlay data set is determined in the segmented 3D training image data set. In one embodiment, the corresponding at least one comparison landmark may be determined by a back projection, starting from the at least one comparison landmark in the visual training representation of the training overlay data set, to the segmented 3D training image data set. If the at least one comparison landmark in the visual training representation of the training overlay data set includes at least two image points (e.g., a contour and/or surface), the at least one comparison landmark corresponding therewith in the segmented 3D training image data set may be determined particularly reliably. Alternatively or in addition, an algorithm for pattern recognition may be applied to the segmented 3D training image data set for determination of the corresponding at least one comparison landmark.

By applying the trained function to the input data, which is based on the defined training position of the deviation, the visual training representation of the training overlay data set, the segmented 3D training image data set, and the training image data, the at least one training landmark in the visual training representation of the training overlay data set and the at least one training landmark corresponding therewith may be identified in the segmented 3D training image data set. At least one parameter of the trained function may be adjusted in act t.11) based on a comparison of the at least one training landmark with the at least one comparison landmark and a comparison of the at least one training and comparison landmark corresponding therewith, respectively.

Providing the trained function in act t.12) may include, for example, storage on a computer-readable storage medium and/or transfer to a provision unit.

In one embodiment, the method may, for example, provide a trained function that may be used in an embodiment of the method for deformation correction.

The present embodiments relate, in a third aspect, to a method (e.g., a computer-implemented method) for providing a further trained function. In a first act tr.1), a preoperative 3D training image data set is received from an examination region of an examination object. Further, in a second act tr.2), a segmented 3D training image data set is generated by segmenting at least one anatomical structure in the preoperative 3D training image data set. In addition, training image data is received in a third act tr.3) from the examination region (e.g., intraoperatively), where a medical object is arranged in the examination region. In addition, mapping of the medical object in the training image data is identified in a fourth act tr.4). Further, in a fifth act tr.5), the segmented 3D training image data set is registered with the training image data. In a sixth act tr.6), a training overlay data set is generated based on the segmented 3D training image data set and the training image data. Further, a visual training representation of the training overlay data set is generated in a seventh act tr.7). Hereafter, in an eighth act tr.8), a training position of a deviation between the training image data and the segmented 3D training image data set is defined in the visual training representation of the training overlay data set. In addition, in a ninth act tr.9), a training deformation rule is determined based on the defined training position of the deviation and the identified mapping of the medical object such that the deviation between the training image data and the segmented 3D training image data set is reduced. In a tenth act tr.10), a corrected comparison overlay data set is generated by application of the training deformation rule to the segmented 3D training image data set. In addition, in an eleventh act tr.11), a corrected training overlay data set is generated by application of the further trained function to further input data. The further input data of the further trained function is based on the defined training position of the deviation, the segmented 3D training image data set, and the training image data. Further, in a twelfth act tr.12), at least one parameter of the further trained function is adjusted based on a comparison between the corrected training overlay data set and the corrected comparison overlay data set. Hereafter, the further trained function is provided in a thirteenth act tr.13).

Receiving the preoperative 3D training image data set and/or the training image data from the examination region of the examination object may include, for example, capturing and/or reading a computer-readable data memory and/or receiving from a data memory unit (e.g., a database). Further, the preoperative 3D training image data set and/or the training image data may be provided by a provision unit of a medical imaging device.

The preoperative 3D training image data set may have, for example, all properties of the preoperative 3D image data set that were described in relation to the method for deformation correction, and vice versa. Further, the training image data may have all properties of the image data that were described in relation to the method for deformation correction, and vice versa. For example, the preoperative 3D training image data set may be a preoperative 3D image data set. Analogously thereto, the training image data may be image data. Further, the preoperative 3D training image data set and/or the training image data may be simulated.

In one embodiment, the medical object (e.g., a guide wire and/or a catheter and/or an endoscope and/or a laparoscope and/or an implant, such as a stent), which is arranged in the examination region of the examination object, may be mapped in the at least one training X-ray image.

The medical object described, which is mapped in the training image data, may be similar to or different than the medical object mapped in the image data that was described in relation to the method for deformation correction, and vice versa. Analogously thereto, the examination object and/or the examination region, in which the medical object is arranged and which is mapped in the preoperative 3D training image data set and/or the training image data, may be the same as or different from the examination object and/or examination region that was described in relation to the method for deformation correction, and vice versa.

In one embodiment, acts tr.2) and tr.4) to tr.10) may each take place analogously to acts b) and d) to f.5) of the method for deformation correction.

In one embodiment, the corrected training overlay data set may be generated by applying the further trained function to the input data, which is based on the defined training position of the deviation, the segmented 3D training image data set, and the training image data. At least one parameter of the further trained function may be adjusted based on a comparison between the corrected training overlay data set and the corrected comparison overlay data set in act tr.12). The comparison may take place, for example, image point by image point. Providing the further trained function in act tr.13) may include, for example, storing on a computer-readable storage medium and/or transferring to a provision unit.

In one embodiment, a further trained function may be provided with the method, which may be used in an embodiment of the method for deformation correction.

The present embodiments relate to, in a fourth aspect, a training unit, which is configured to carry out the above-described inventive method for providing a trained function and/or for providing a further trained function, and respective aspects. In one embodiment, the training unit includes a training interface and a training arithmetic unit. The training unit is configured to carry out the method and corresponding aspects in that the training interface and the training arithmetic unit are configured to carry out the corresponding method acts.

In an embodiment of the training unit, the training interface may be configured for carrying out acts t.1), t.3), and/or t.12), which were described in relation to the computer-implemented method for providing a trained function. Further, the training arithmetic unit may be configured for carrying out acts t.2) and t.4) to t.11), which were described in relation to the computer-implemented method for providing a trained function.

In a further embodiment of the training unit, the training interface may be configured for carrying out acts tr.1), tr.3) and/or tr.12), which were described in relation to the computer-implemented method for providing a further trained function. Further, the training arithmetic unit may be configured for carrying out acts tr.2) and tr.4) to tr.11), which were described in relation to the computer-implemented method for providing a further trained function.

The advantages of the training unit substantially correspond to the advantages of the method for providing a trained function and/or for providing a further trained function. Features, advantages, or alternative embodiments mentioned in this connection may likewise also be transferred to the other subject matter, and vice versa.

The present relates to, in a fifth aspect, a medical imaging device including a provision unit. The medical imaging device (e.g., the provision unit) is configured for carrying out a method for deformation correction. Further, the medical imaging device is configured for the acquisition of image data from the examination region of the examination object. Further, the medical imaging device may be configured for the acquisition and/or for receiving the preoperative 3D image data set from the examination region of the examination object.

The medical imaging device may be configured, for example, as a medical X-ray apparatus (e.g., C-arm X-ray apparatus) and/or magnetic resonance tomography system (MRT) and/or computed tomography system (CT) and/or sonography device and/or positron emission tomography system (PET).

The advantages of the medical imaging device substantially correspond to the advantages of the method for deformation correction. Features, advantages, or alternative embodiments mentioned in this connection may likewise also be transferred to the other subject matter, and vice versa.

The present embodiments relate to, in a sixth aspect, a computer program product with a computer program that may be loaded directly into a memory of a provision unit, with program segments in order to carry out all acts of the method for deformation correction when the program segments are run by the provision unit. Alternatively or additionally, the computer program may be loaded directly into a training memory of a training unit, with program segments in order to carry out all acts of the method for providing a trained function and/or for providing a further trained function and respective aspects when the program segments are run by the training unit.

The present embodiments relate to, in a seventh aspect, a computer-readable storage medium, on which program segments that may be read and run by a provision unit are stored in order to carry out all acts of the method for deformation correction when the program segments are run by the provision unit. Alternatively or additionally, program segments that may be read and run by a training unit are stored on the computer-readable storage medium in order to carry out all acts of the method for providing a trained function and/or for providing a further trained function and respective aspects when the program segments are run by the training unit.

The present embodiments relate to, in an eighth aspect, a computer program or computer-readable storage medium, including a trained function provided by a method or a corresponding aspect.

An implementation largely in terms of software has the advantage that even previously used provision units and/or training units may be easily retrofitted via a software update in order to work according to the present embodiments. In addition to the computer program, a computer program product of this kind may optionally include additional elements, such as, for example, documentation and/or additional components, and hardware components, such as, for example, hardware keys (e.g., dongles, etc.) in order to use the software.

BRIEF DESCRIPTION OF THE DRAWINGS

Exemplary embodiments of the invention are illustrated in the drawings and will be described in more detail below. The same reference numerals are used in different figures for the same features. In the drawings.

DETAILED DESCRIPTION

Figure 1:
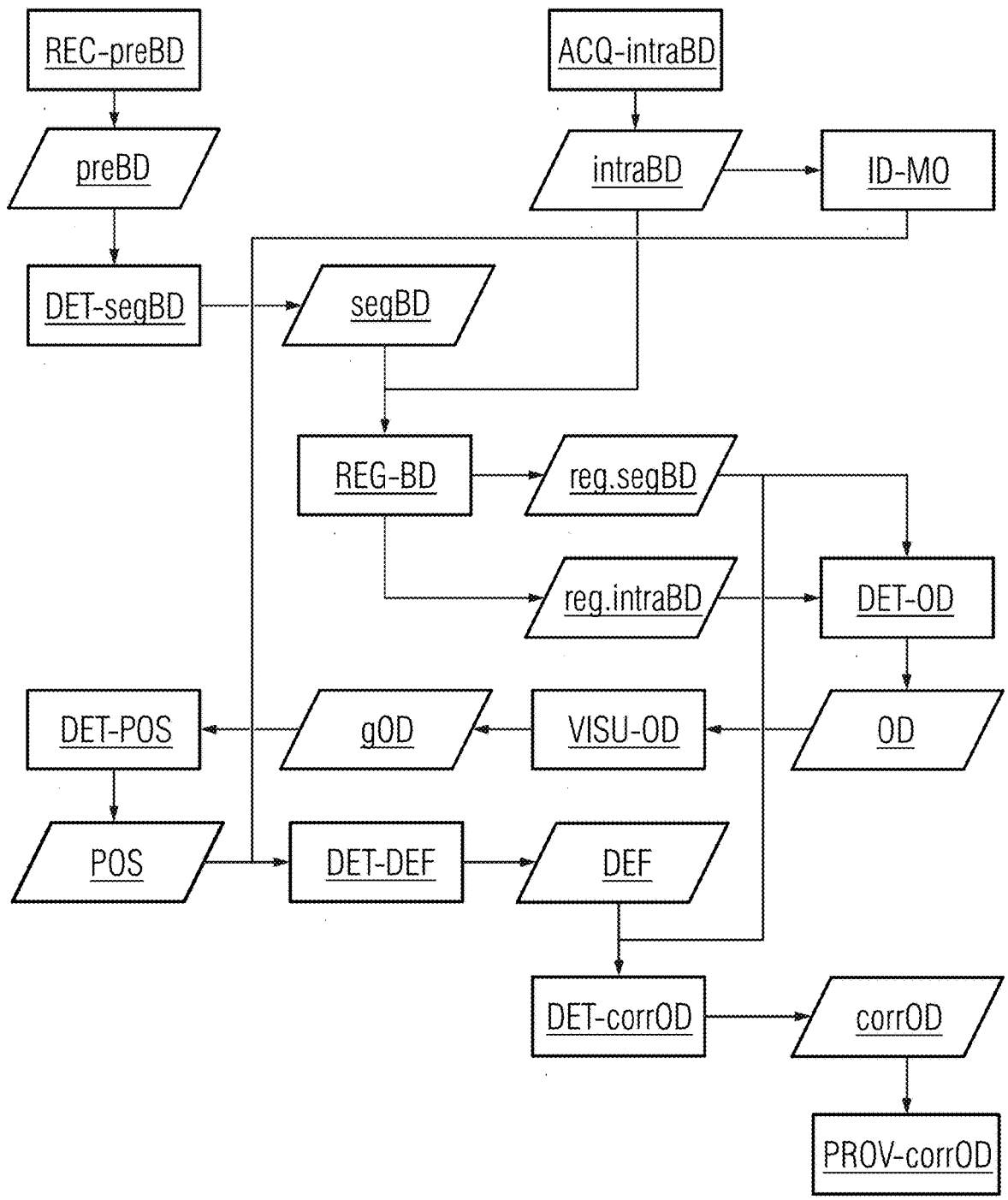
FIGS. 1 to 5 show schematic representations of different embodiments of a method for deformation correction.

FIG. 1 schematically illustrates an embodiment of a method for deformation correction. In a first act a), a preoperative three-dimensional (3D) image data set preBD may be received REC-preBD from an examination region of an examination object, which is acquired (e.g., preoperatively) by a first medical imaging device. Further, in a second act b), a segmented 3D image data set segBD may be generated DET-segBD by segmenting at least one anatomical structure in the preoperative 3D image data set preBD. Further, in a third act c), image data intraBD may be acquired ACQ-intraBD (e.g., intraoperatively) from the examination region, with a medical object being arranged in the examination region. Further, mapping of the medical object in the image data intra-BD may be identified ID-MO in a fourth act d). Hereafter, the segmented 3D image data set segBD may be registered REG-BD with the image data intraBD in a fifth act e). A registered segmented 3D image data set reg.segBD and/or registered image data reg.intraBD may be provided in the process. The registered image data reg.intraBD and the registered segmented 3D image data set reg.segBD are subsequently provided as the image data intraBD and the segmented 3D image data set segBD.

In addition, in a sixth act f.1), an overlay data set OD may be generated DET-OD based on the segmented 3D image data set reg.segBD (e.g., registered) and the image data reg.intraBD (e.g., registered). Further, a visual representation of the overlay data set gOD may be displayed in a seventh act f.2) by a display unit. Here, in an eighth act f.3), a position POS of a deviation between the image data reg.intraBD and the segmented 3D image data set reg.segBD may be defined DET-POS in the visual representation of the overlay data set gOD. Further, in a ninth act f.4), a deformation rule DEF may be determined DET-DEF based on the defined position of the deviation POS and the identified mapping of the medical object such that the deviation between the image data reg.intraBD and the segmented 3D image data set reg.segBD is reduced (e.g., minimized). Hereafter, a corrected overlay data set corrOD may be generated DET-corrOD by applying the deformation rule DEF to the segmented 3D image data set reg.segBD. Further, the corrected overlay data set corrOD may be provided PROV-corrOD in a tenth act f.6).

In one embodiment, determining DET-POS the position of the deviation POS in step f.3) may take place via a user input using an input unit.

Further, the overlay data set OD may have distance information relating to the deviation between the segmented 3D image data set reg.segBD and the image data reg.intraBD. Determining DET-POS the position of the deviation POS in act f.3) may also take place based on the distance information.

In one embodiment, the deformation rule DEF may be determined DET-DEF in act f.4) also based on a material property of the medical object and/or an operating parameter of the medical object and/or a form of the medical object and/or a tissue parameter of the examination object and/or a physiological parameter of the examination object.

Further, generating DET-DEF the segmented 3D image data set segBD may include an annotation of at least one reference landmark on the at least one anatomical structure AS in the segmented 3D image data set segBD. The annotation of the at least one reference landmark may take place (e.g., manually), for example, via a user input using an input unit, and/or semi-automatically, and/or automatically (e.g., by applying an algorithm for pattern recognition), and/or based on an anatomy atlas.

In one embodiment, the method for deformation correction may be applied for the adaptation of segmenting deformations in imaging (e.g., in neuroradiology), monitoring by way of imaging when inserting an aortic valve, or mapping a deformation of vessels in the liver.

Figure 2:
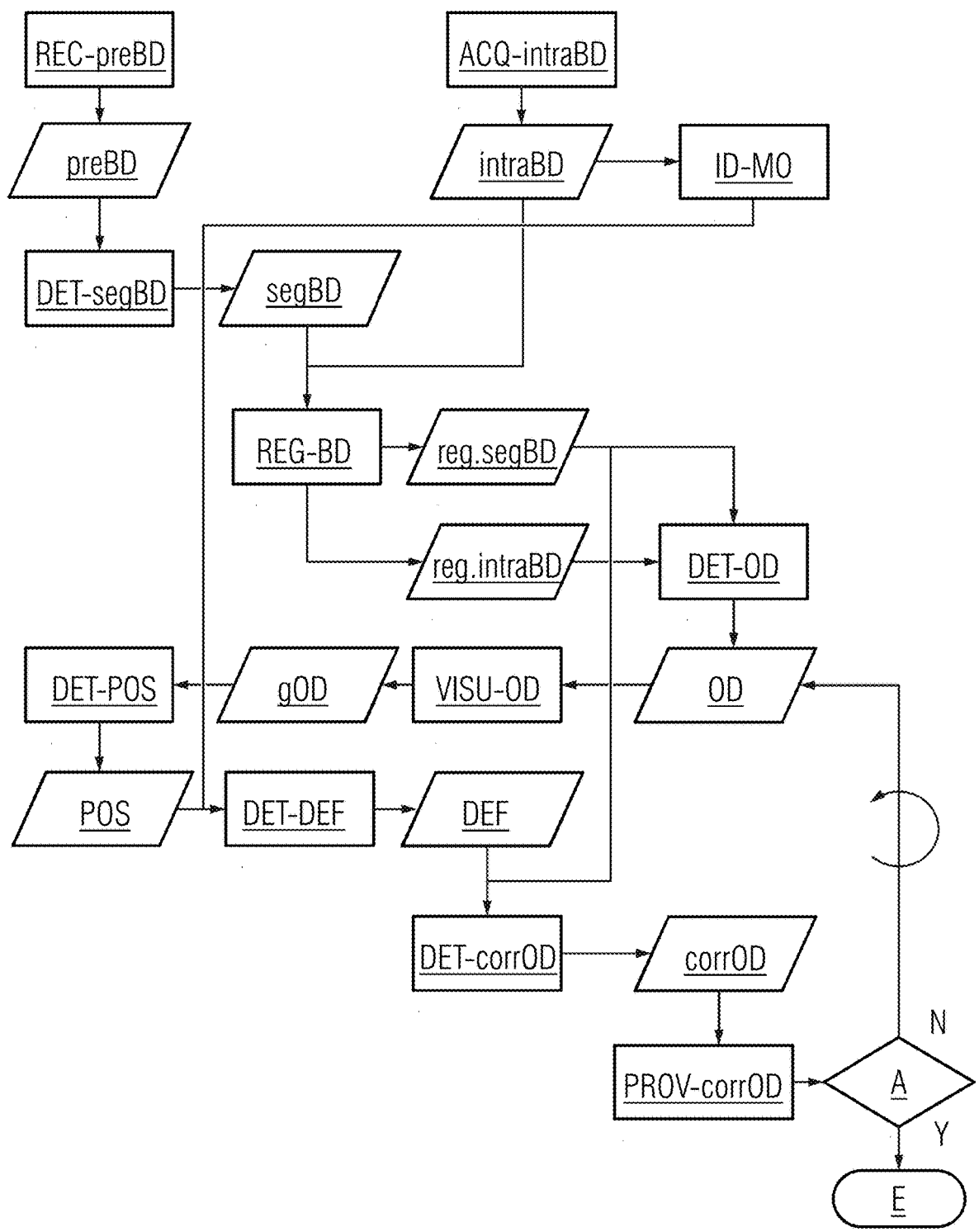

In the embodiment of the method for deformation correction schematically illustrated in FIG. 2, the method may be carried out repeatedly beginning from act f.2) for generation DET-corrOD of the corrected overlay data set corrOD through to the occurrence Y of a termination condition A. The corrected overlay data set corrOD may be provided PROV-corrOD as the overlay data set OD in act f.2).

Figure 3:
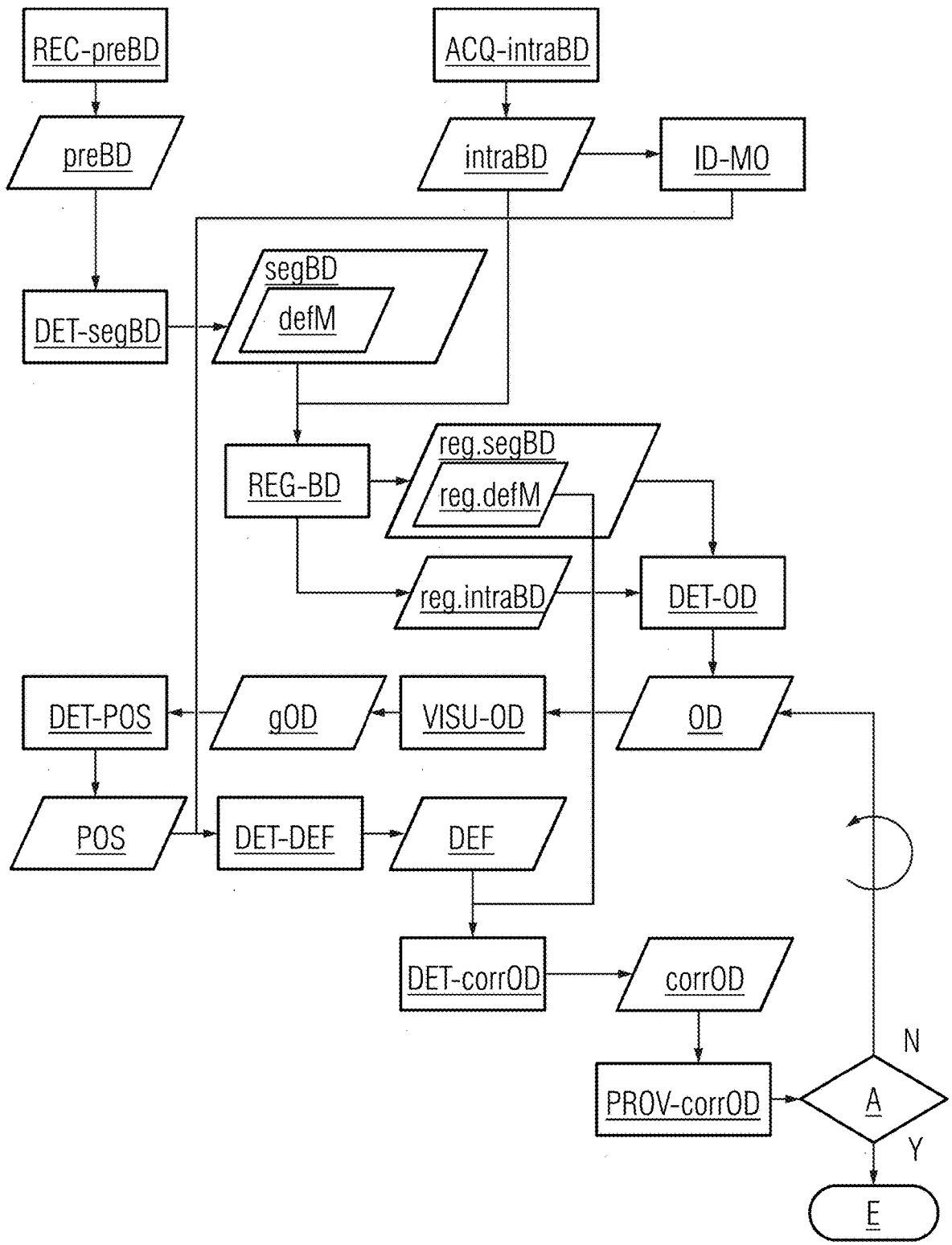

FIG. 3 shows a schematic representation of a further embodiment of the method for deformation correction, where the segmented 3D image data set segBD is generated DET-segBD having a deformable model defM of the at least one anatomical structure. In one embodiment, the deformation rule DEF may be applied DET-corrOD in act f.5) to the deformable model defM. Further, act e) may include an adjustment of the deformable model defM in the, for example, registered, segmented 3D image data set reg.segBD. For example, a registered deformable model reg.defM may be provided in the process.

Figure 4:
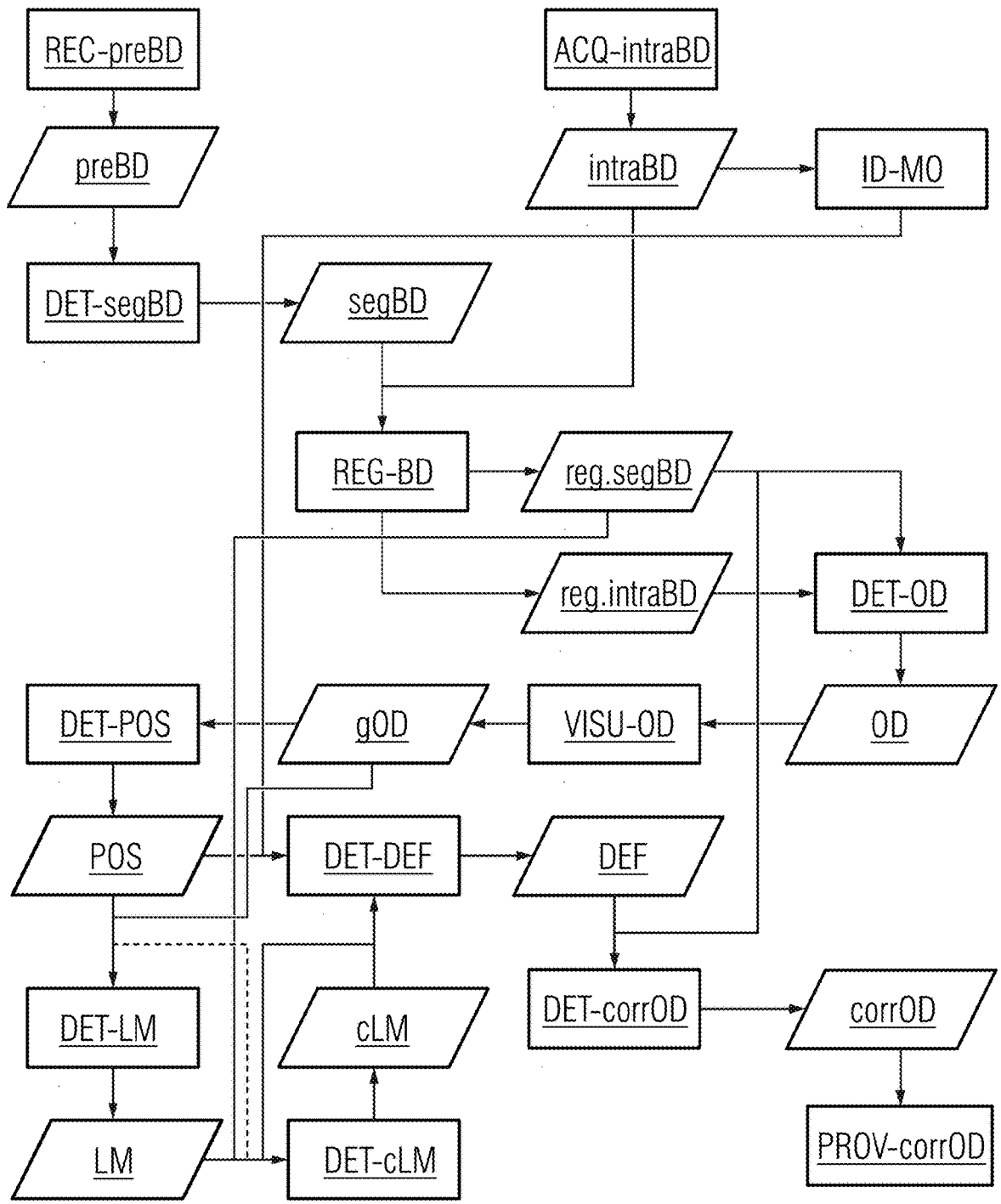

FIG. 4 schematically illustrates a further advantageous embodiment of the method for deformation correction. Act f.3) may also include determination DET-cLM of a corresponding at least one landmark cLM in the segmented 3D image data set segBD based on the defined position of the deviation POS. At least one of the at least one reference landmark may be determined as the corresponding at least one landmark cLM in this case.

Act f.3) may also include an identification DET-LM of at least one landmark LM in the visual representation of the overlay data set gOD based on the defined position of the deviation POS. In addition, the corresponding at least one landmark cLM may be determined based on the at least one landmark LM and/or the defined position of the deviation POS.

Figure 5:
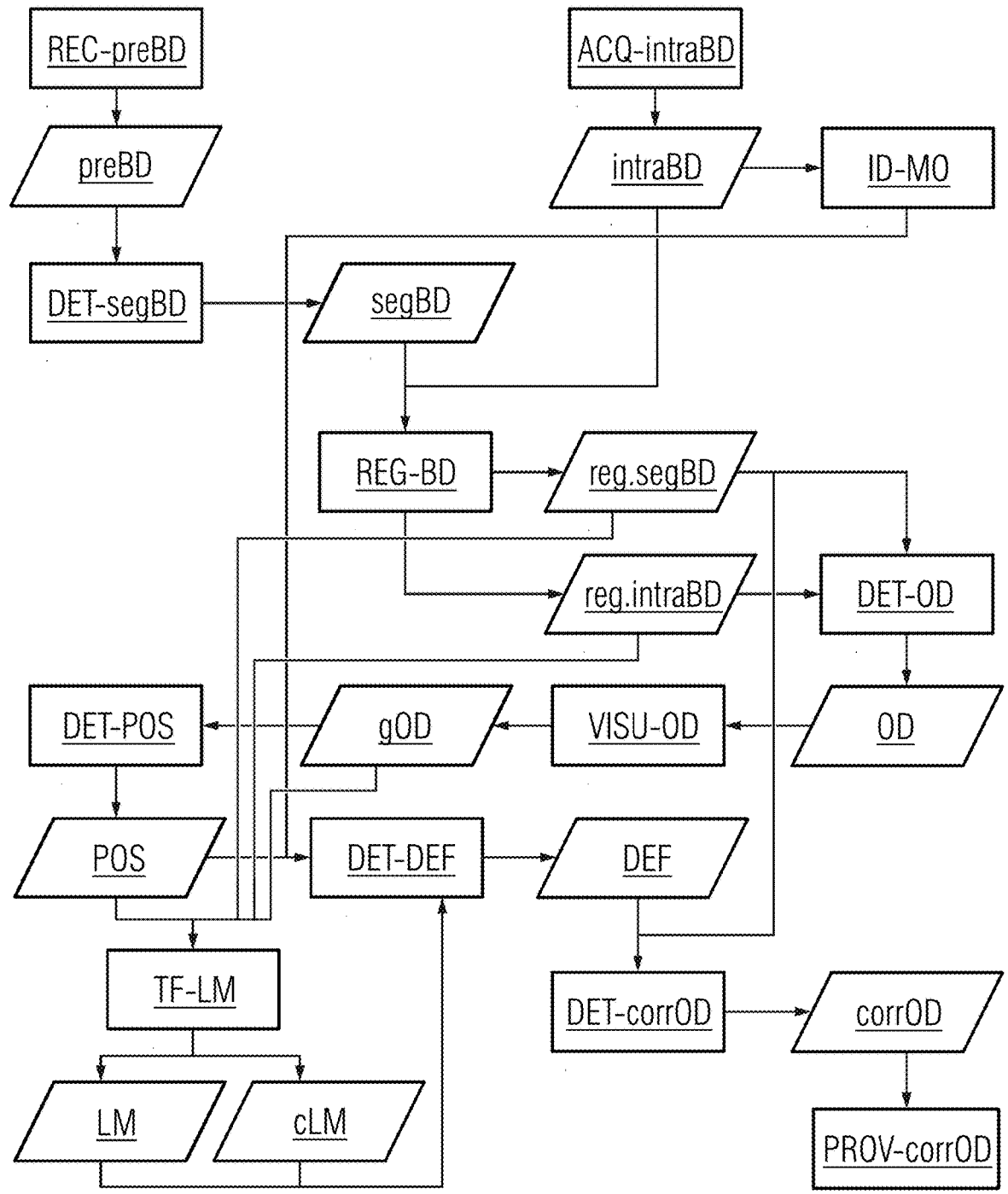

FIG. 5 shows a further embodiment of the method for deformation correction, where the identification DET-LM of the at least one landmark LM in the visual representation of the overlay data set gOD and the at least one landmark cLM corresponding therewith in the segmented 3D image data set reg.segBD occurs by application of a trained function TF-LM to input data. The input data may be based on the defined position of the deviation POS, the visual representation of the overlay data set gOD, the segmented 3D image data set reg.segBD, and the image data reg.intraBD. Further, at least one parameter of the trained function TF-LM may be based on a comparison of at least one training landmark with at least one comparison landmark and a comparison of the at least one training and comparison landmark corresponding therewith, respectively.

Figure 6:
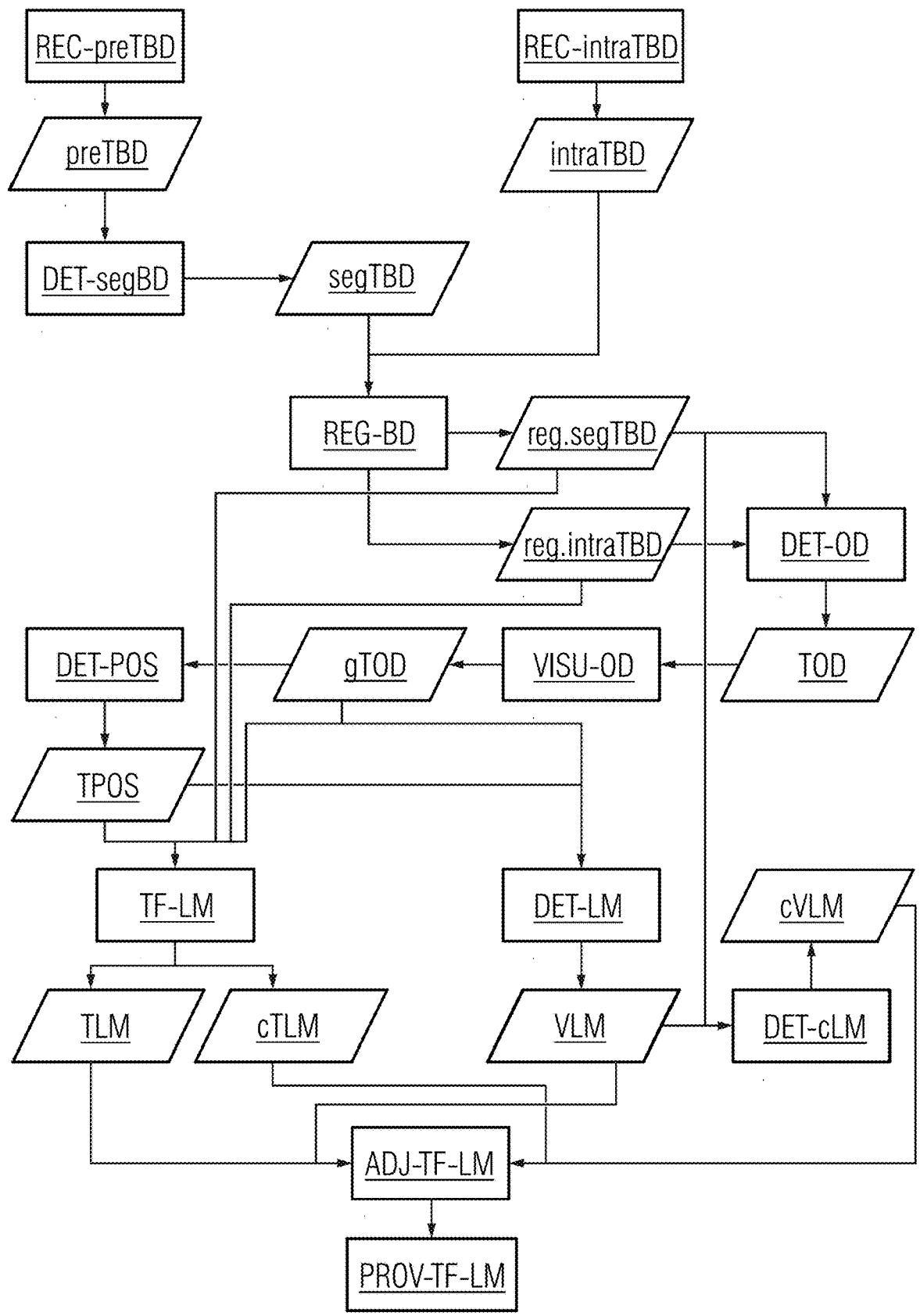
FIG. 6 shows a schematic representation of one embodiment of a method for providing a trained function.

FIG. 6 schematically shows an embodiment of a method for providing a trained function TF-LM. A preoperative 3D training image data set preTBD may be received REC-preTBD from an examination region of an examination object. Further, a segmented 3D training image data set segTBD may be generated DET-segBD by segmenting at least one anatomical structure in the preoperative 3D training image data set preTBD. Further, training image data intraTBD (e.g., intraoperative training image data) may be received from the examination region, with a medical object being arranged in the examination region. Hereafter, the segmented 3D training image data set segTBD may be registered REG-BD with the training image data intraTBD. Further, a registered segmented 3D training image data set reg.segTBD may be provided hereafter as the segmented 3D training image data set segTBD, and/or registered training image data reg.intraTBD may be provided as the training image data intra.TBD. Further, a training overlay data set TOD may be generated DET-OD by an overlaying (e.g., weighted and/or adaptive) of the segmented 3D training image data set reg.segTBD and the training image data reg.intraTBD. Further, a visual training representation of the training overlay data set gTOD may be generated VISU-OD. The visual training representation of the training overlay data set gTOD may be simulated, for example, using a display geometry of a display unit. Further, a training position TPOS of a deviation between the training image data reg.intraTBD and the segmented 3D training image data set reg.segTBD may be defined DET-POS in the visual training representation of the training overlay data set gTOD. Further, at least one comparison landmark VLM may be identified DET-LM in the visual training representation of the training overlay data set gTOD based on the defined training position TPOS of the deviation. In addition, at least one comparison landmark cVLM corresponding with the at least one comparison landmark LM may be determined DET-cLM in the segmented 3D training image data set reg.segTBD. Further, at least one training landmark TLM may be identified in the visual training representation of the training overlay data set gTOD and an at least one training landmark cTLM corresponding therewith in the segmented 3D training image data set reg.segTBD by applying the trained function TF-LM to input data. In one embodiment, the input data of the trained function TF-LM may be based on the defined training position TPOS of the deviation, the visual training representation of the training overlay data set gTOD, the segmented 3D training image data set reg.segTBD, and the training image data reg.intraTBD. At least one parameter of the trained function TF-LM may be adjusted ADJ-TF-LM based on a comparison of the at least one training landmark TLM with the at least one comparison landmark LM and a comparison of the at least one training landmark cTLM and at least one comparison landmark cVLM corresponding therewith, respectively. Hereafter, the trained function TF-LM may be provided PROV-TF-LM.

Figure 7:
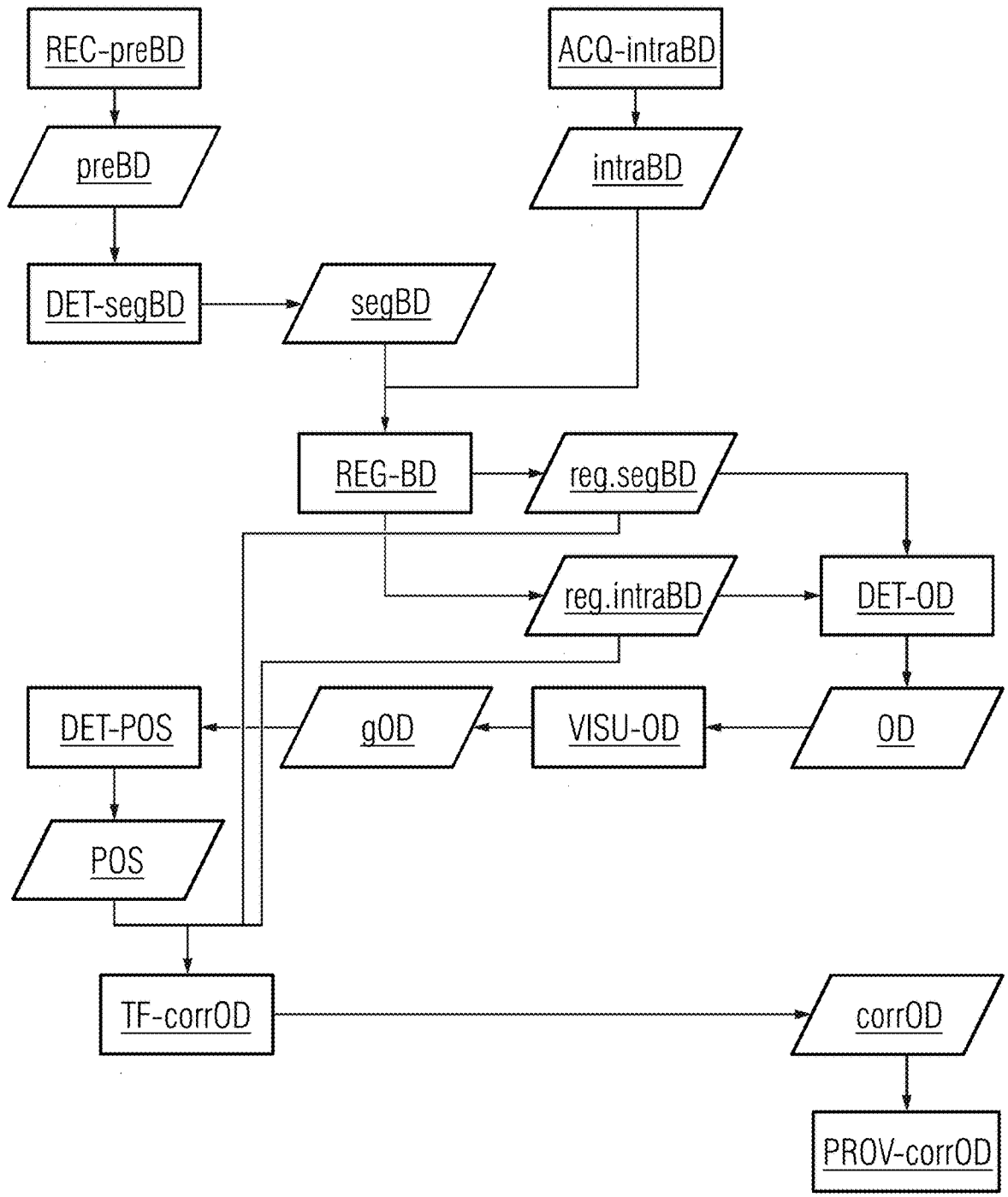
FIG. 7 shows a schematic representation of another embodiment of a method for deformation correction.

FIG. 7 shows a schematic representation of a further embodiment of the method for deformation correction. The corrected overlay data set corrOD may be generated by applying a further trained function TF-corrOD to further input data. The further input data may be based on the defined position of the deviation POS, the segmented 3D image data set reg.segBD, and the image data reg.intraBD. Further, at least one parameter of the further trained function TF-corrOD may be based on a comparison of a corrected training overlay data set with a corrected comparison overlay data set.

Figure 8:
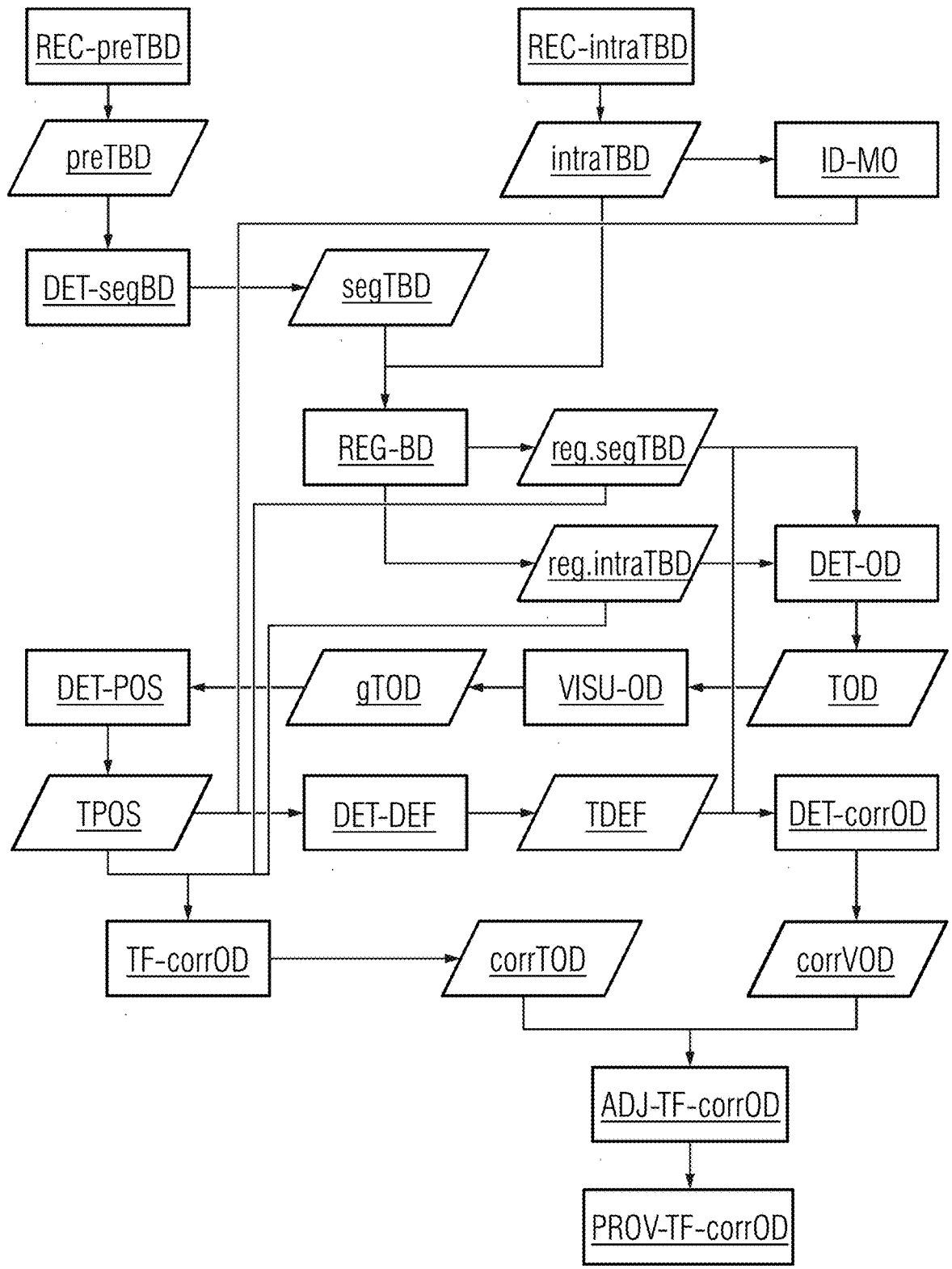
FIG. 8 shows a schematic representation of one embodiment of a method for providing a further trained function.

FIG. 8 schematically illustrates one embodiment of a method for providing a further trained function TF-corrOD. A preoperative 3D training image data set preTBD may be received REC-preTBD from an examination region of an examination object. Further, a segmented 3D training image data set segTBD may be generated DET-segBD by segmenting at least one anatomical structure in the preoperative 3D training image data set preTBD. Further, training image data intraTBD (e.g., intraoperative) may be received from the examination region, with a medical object being arranged in the examination region. Mapping of the medical object may be identified ID-MO in the training image data intraTBD. Hereafter, the segmented 3D training image data set segTBD may be registered REG-BD with the training image data intraTBD. Further, a registered segmented 3D training image data set reg.segTBD may be provided hereafter as the segmented 3D training image data set segTBD, and/or registered training image data reg.intraTBD may be provided as the training image data intra.TBD. Further, a training overlay data set TOD may be generated DET-OD by an overlaying (e.g., weighted and/or adaptive) of the segmented 3D training image data set reg.segTBD and the training image data reg.intraTBD. Further, a visual training representation of the training overlay data set gTOD may be generated VISU-OD. The visual training representation of the training overlay data set gTOD may be simulated, for example, based on a display geometry of a display unit. Further, a training position TPOS of a deviation between the training image data reg.intraTBD and the segmented 3D training image data set reg.segTBD may be defined DET-POS in the visual training representation of the training overlay data set gTOD. Further, a training deformation rule TDEF may be determined DET-DEF based on the defined training position of the deviation TPOS and the identified mapping of the medical object such that the deviation between the segmented 3D training image data set reg.segTBD and the training image data reg.intraTBD is reduced. Further, a corrected comparison overlay data set corrVOD may be generated DET-corrOD by applying the training deformation rule TDEF to the segmented 3D training image data set reg.segTBD. In addition, a corrected training overlay data set corrTOD may be generated by applying the further trained function TF-corrOD to further input data. In one embodiment, the further input data of the further trained function TF-corrOD may be based on the defined training position of the deviation TPOS, the segmented 3D training image data set reg.segTBD, and the training image data reg.intraTBD. Further, at least one parameter of the further trained function TF-corrOD may be adjusted ADJ-TF-corrOD based on a comparison between the corrected training overlay data set corrTOD and the corrected comparison overlay data set corrVOD. Hereafter, the further trained function TF-corrOD may be provided PROV-TF-corrOD.

Figure 9:
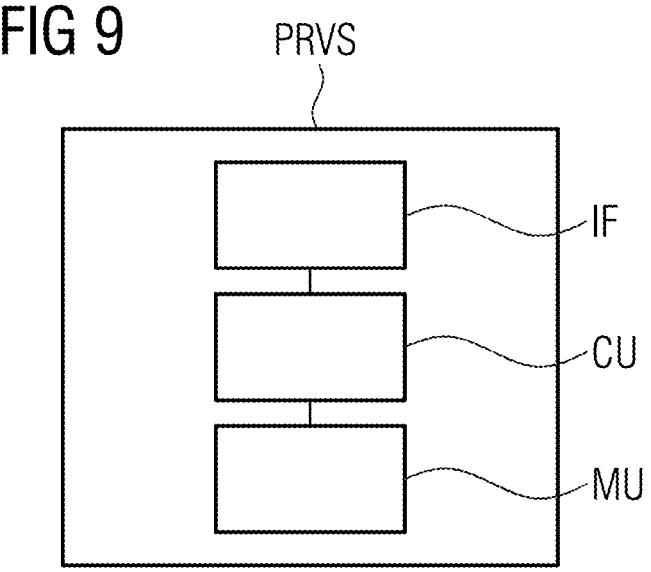
FIG. 9 shows a schematic representation of one embodiment of a provision unit.

FIG. 9 schematically shows one embodiment of a provision unit PRVS including an interface IF, an arithmetic unit CU, and a memory unit MU. The provision unit PRVS may be configured to carry out a method for deformation correction of one or more of the present embodiments in that the interface IF and the arithmetic unit CU are configured to carry out the corresponding method acts.

For example, the interface IF may be configured to carry out acts a) and f.6) of the method for deformation correction. Further, the arithmetic unit may be configured for carrying out the remaining acts of the proposed method for deformation correction.

Figure 10:
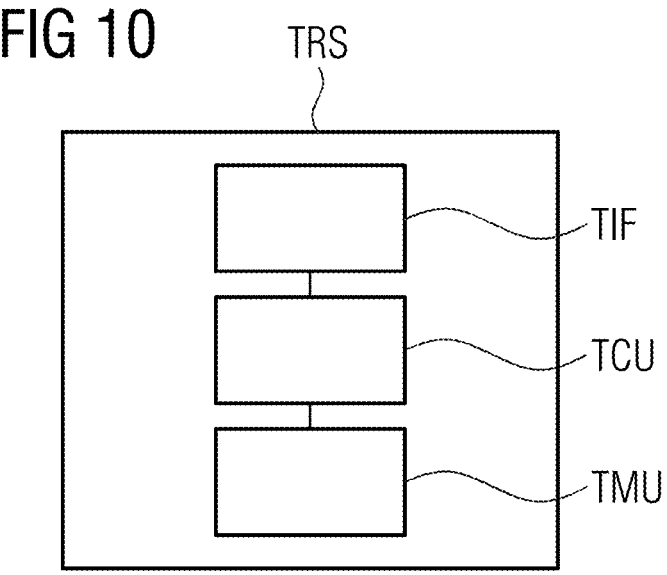
FIG. 10 shows a schematic representation of one embodiment of a training unit.

FIG. 10 schematically shows a proposed training unit TRS including a training interface TIF, a training arithmetic unit TCU, and a training memory unit TMU. The training unit TRS may be configured to carry out a method of one or more of the present embodiments for providing a trained function PROV-TF-LM and/or for providing a further trained function PROV-TF-corrOD and respective aspects in that the training interface TIF and the training arithmetic unit TCU are configured to carry out the corresponding method acts.

For example, the training interface TIF may be configured for receiving the preoperative 3D training image data set preTBD and/or for receiving the training image data intraTBD. Further, the training interface TIF may be configured for providing the trained function PROV-TF-LM and/or the further trained function PROV-TF-corrOD.

The provision unit PRVS and/or the training unit TRS may be, for example, a computer, a microcontroller, or an integrated circuit. Alternatively, the provision unit PRVS and/or the training unit TRS may be a real or virtual group of computers (a technical term for a real group is "Cluster", a technical term for a virtual group is "Cloud"). The provision unit PRVS and/or the training unit TRS may also be configured as a virtual system, which is run on a real computer or a real or virtual group of computers (e.g., virtualization).

An interface IF and/or a training interface TIF may be a hardware or software interface (e.g., PCI bus, USB or Firewire). An arithmetic unit CU and/or a training arithmetic unit TCU may have hardware elements or software elements (e.g., a microprocessor or a field programmable gate array (FPGA)). A memory unit MU and/or a training memory unit TMU may be implemented as a non-permanent working memory (e.g., random access memory (RAM)) or as a permanent mass memory (e.g., hard disk, USB stick, SD card, solid state disk (SSD)).

The interface IF and/or the training interface TIF may, for example, include a plurality of sub-interfaces that carry out the different acts of the respective method. In other words, the interface IF and/or the training interface TIF may also be understood as a large number of interfaces IF or a large number of training interfaces TIF. The arithmetic unit CU and/or the training arithmetic unit TCU may include, for example, a plurality of sub-arithmetic units that carry out different acts of the respective method. In other words, the arithmetic unit CU and/or the training arithmetic unit TCU may also be understood as a large number of arithmetic units CU or a large number of training arithmetic units TCU.

Figure 11:
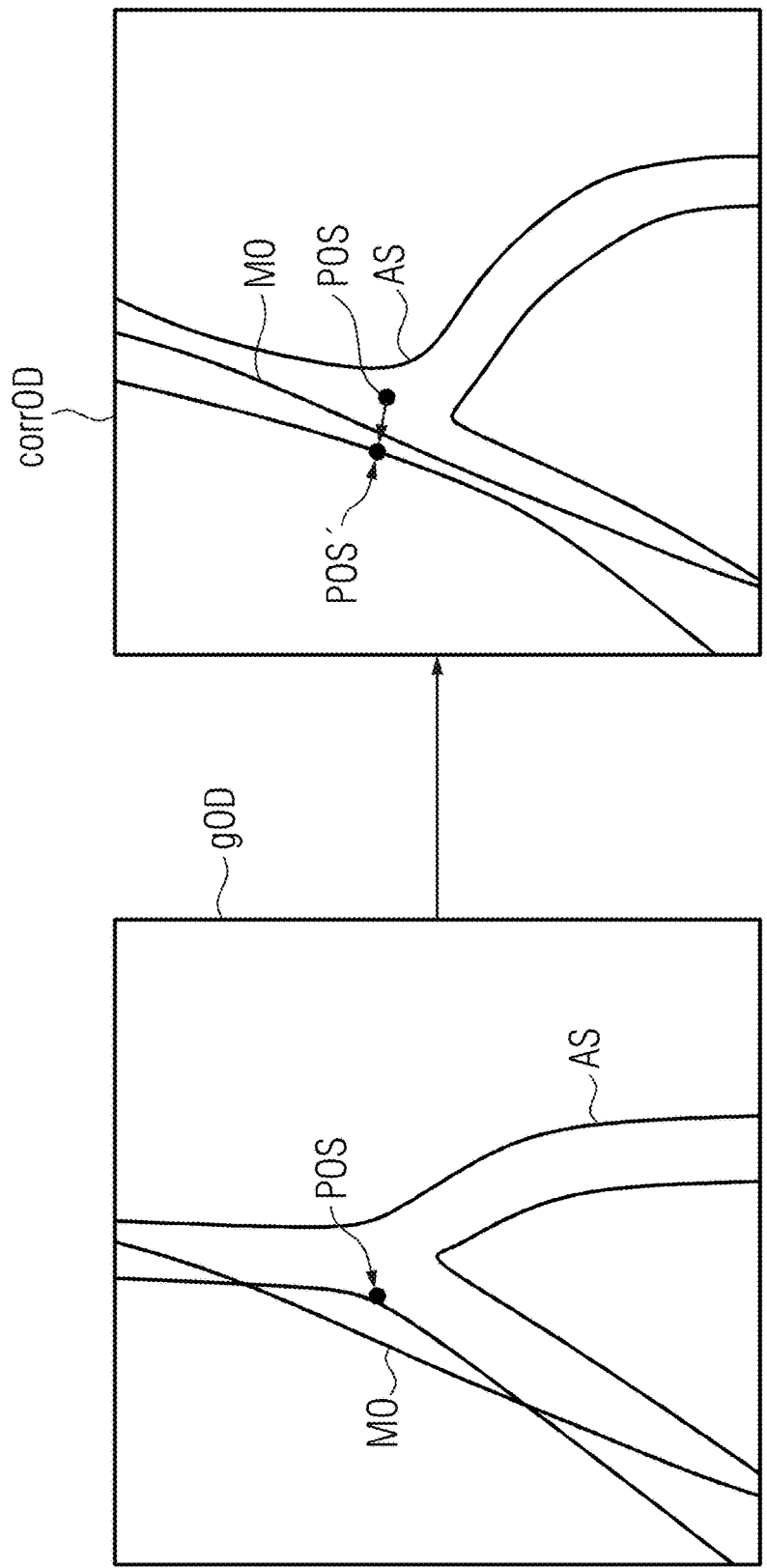
FIG. 11 shows a schematic representation of one embodiment of a method for the generation of a corrected overlay data set.

FIG. 11 shows a schematic representation of an embodiment for generating a corrected overlay data set corrOD. The visual representation of the overlay data set gOD may have, for example, a vessel section as the at least one anatomical structure AS in the segmented 3D image data set reg.segBD. Further, mapping of the medical object MO (e.g., a guide wire and/or catheter and/or endoscope and/or laparoscope and/or implant) may be identified ID-MO in the image data intraTBD. Assuming that the mapping of the medical object MO has to run substantially inside the vessel section, the position of the deviation POS may be defined DET-POS. In the present example, the position of the deviation POS may be defined DET-POS, for example, in the vicinity of the bifurcation of the vessel section. For this, the visual representation of the overlay data set gOD may be displayed, for example, by a display unit. Hereafter, a user may define DET-POS, via an input using an input unit (e.g., a pointing device, such as a computer mouse and/or a joystick, and/or a stylus and/or a keyboard, and/or by gesture control). Further, the input unit may be integrated in the display unit (e.g., as a capacitive input display). Alternatively or in addition, the position of the deviation POS may be defined DET-POS by applying an algorithm for localization of deviations. The algorithm for the localization of deviations may be configured, for example, to carry out a pattern recognition (e.g., identification of anatomical and/or geometric features) in the visual representation of the overlay data set gOD. For example, the algorithm for the localization of deviations may be configured to compare the geometric and/or anatomical features of the portion of the image data reg.intraBD and of the portion of the segmented 3D image data set reg.segBD, respectively with each other, which portions are overlaid in the visual representation of the overlay data set gOD, and to localize a deviation that occurs so as to be accurate to an image point. Hereafter, the deformation rule DEF may be determined DET-DEF based on the position of the deviation POS and the identified mapping of the medical object MO. The corrected overlay data set corrOD may be generated DET-corrOD by applying the deformation rule DEF to the segmented 3D image data set reg.segBD. In the present example, it is illustrated that the at least one anatomical structure AS (e.g., the vessel section) was deformed in the segmented 3D image data set reg.segBD such that, by the application of the deformation rule DEF, the medical object MO runs inside the vessel section. The position of the deviation POS (e.g., with the vessel section AS) may be deformed in the direction of the position POS' in the corrected overlay data set corrOD.

Figure 12:
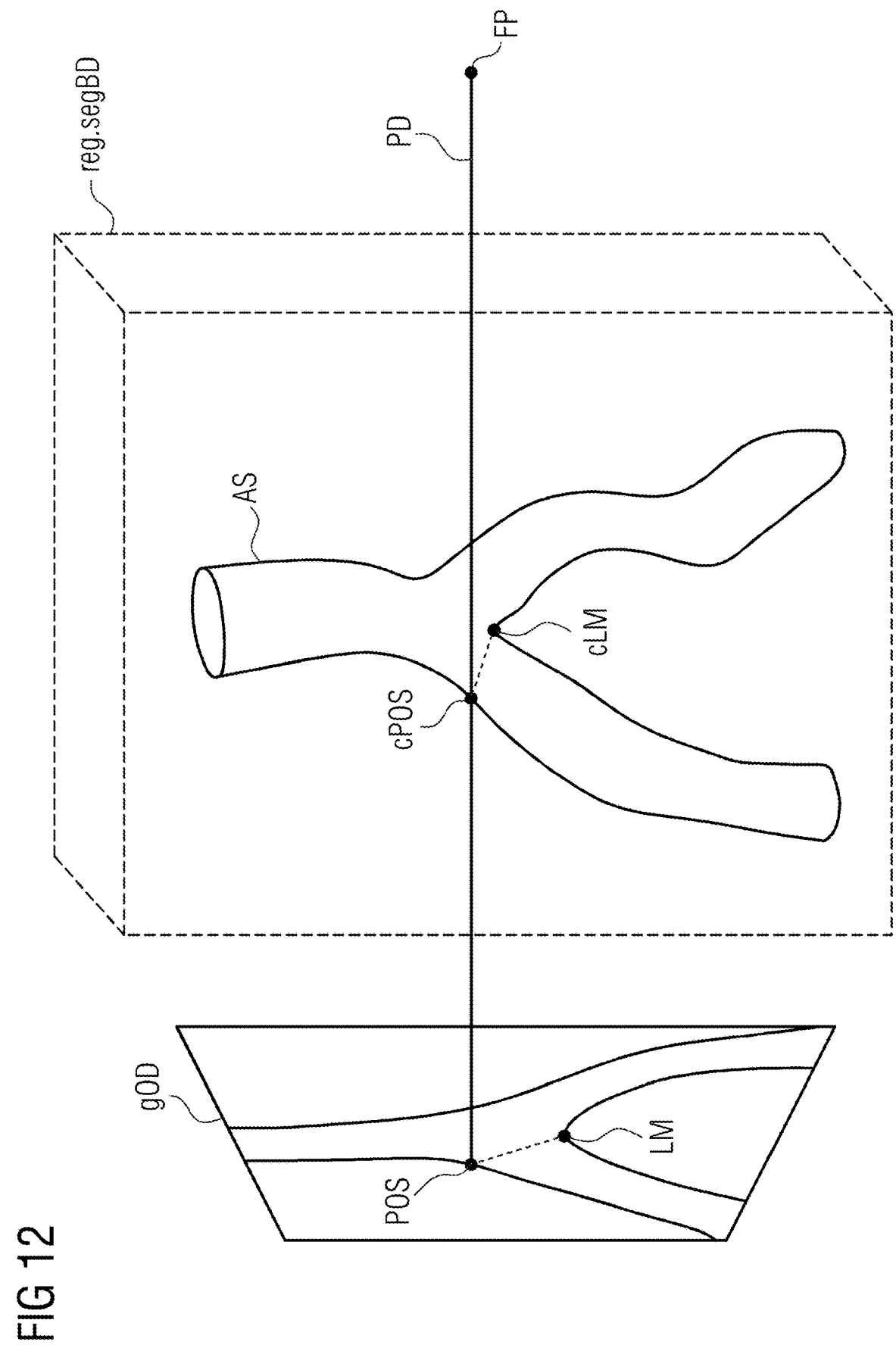
FIG. 12 shows a schematic representation of one embodiment of a method for identification of a corresponding position.

In the embodiment of the method of one or more of the present embodiments for deformation correction schematically illustrated in FIG. 12, act f.4) may also include determining a position cPOS in the segmented 3D image data set reg.segBD corresponding with the defined position of the deviation POS by a back projection. In one embodiment, the visual representation of the overlay data set gOD may be generated by a projection (e.g., a two-dimensional projection) of the segmented 3D image data set reg.segBD along a specified projection direction PD. This is advantageous, for example, with two-dimensional image data intraBD, which has projection mapping of the examination region. The projection direction PD may be specified as a function of (e.g., parallel to) a projection direction for the acquisition of image data ACQ-intraBD. In one embodiment, the projection direction for acquisition of the image data may run through a focal point FP of the X-ray source. In one embodiment, the back projection direction may run anti-parallel to projection direction PD for the projection of the segmented 3D image data set reg.segBD on generation of the overlay data set DET-OD. In one embodiment, the corresponding position of the deviation cPOS in the segmented 3D image data set reg.segBD may lie on a spatial axis that runs parallel to the back projection direction through the focal point FP of the projection mapping. Further, the corresponding position cPOS along the back projection direction may be determined, for example, as the intersection with the at least one anatomical structure AS, which is contained in the segmented 3D image data set. Alternatively or in addition, the corresponding position cPOS along the back projection direction may be determined as the intersection with the deformable model reg.defM of the at least one anatomical structure AS.

Further, the at least one landmark LM may be identified DET-LM in the visual representation of the overlay data set gOD based on the defined position of the deviation POS. For determination DET-DEF of the deformation rule DEF, the at least one landmark cLM corresponding with the at least one landmark LM may be determined in the segmented 3D image data set reg.segBD. The corresponding at least one landmark cLM may be determined, for example, by a back projection of the at least one landmark LM counter to the projection direction PD. Alternatively or in addition, starting from the corresponding position cPOS, the corresponding at least one landmark cLM may be determined based on a relative positioning of the at least one landmark LM with respect to the position of the deviation POS.

Figure 13:
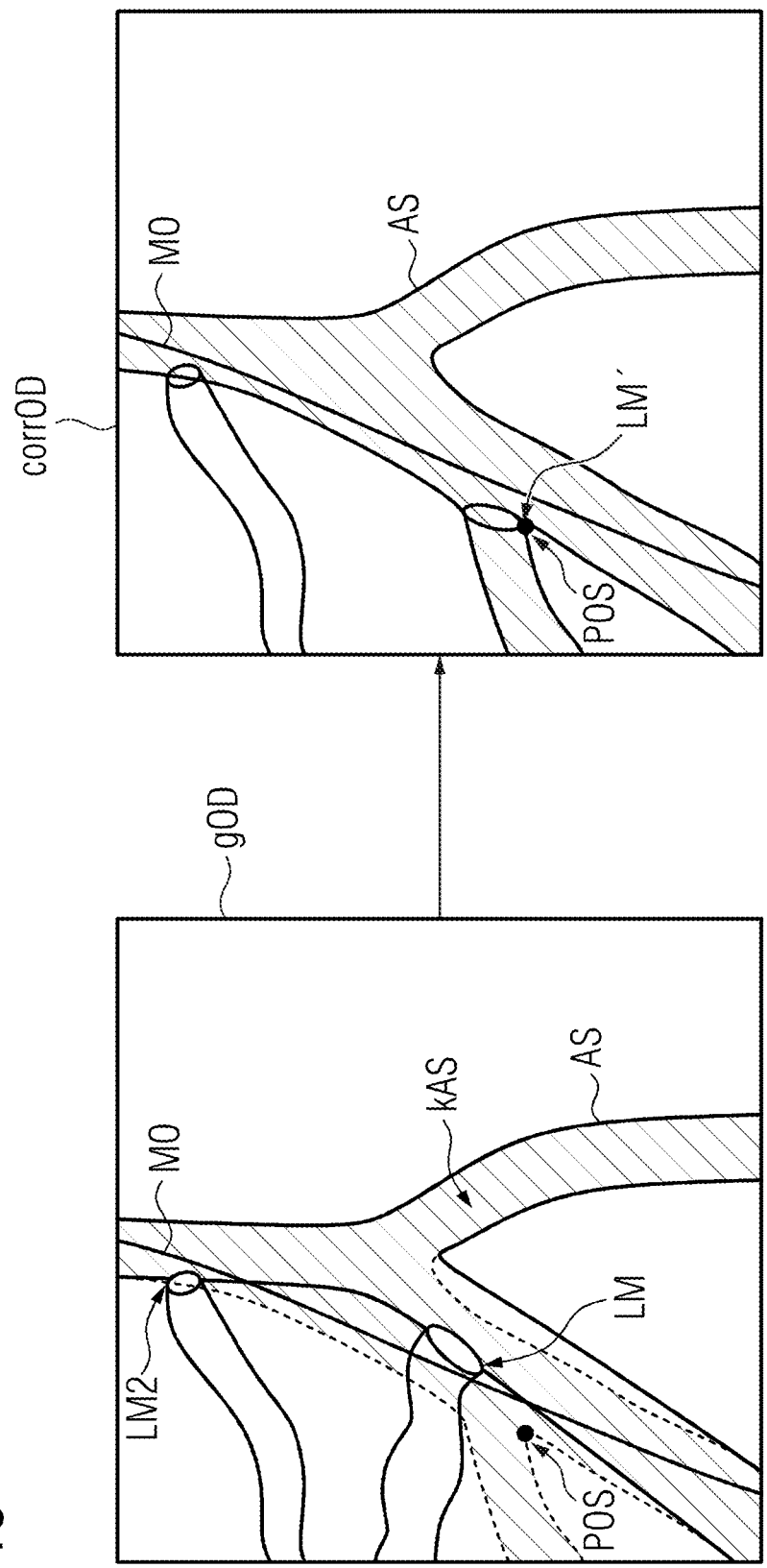
FIG. 13 shows a schematic representation of another embodiment of a method for the generation of a corrected overlay data set.

FIG. 13 shows a schematic representation of a further embodiment for generating a corrected overlay data set corrOD. In one embodiment, the visual representation of the overlay data set gOD may have a portion of the segmented 3D image data set reg.segBD and a portion of the image data reg.intraBD. In one embodiment, the portion of the segmented 3D image data set segBD (e.g., including the deformable model defM of the at least one anatomical structure AS) may have a contrasted mapping of the at least one anatomical structure AS. Further, the portion of the image data reg.intraBD may have mapping (e.g., contrasted mapping) of at least one part kAS of the anatomical structure and of the medical object MO (e.g., arranged therein) at the instant of acquisition of the image data intraBD. The arrangement of the medical object MO in part of the at least one anatomical structure AS may lead to a deformation of the at least one anatomical structure AS. A deviation between the respective mappings of the anatomical structure AS in the visual representation of the overlay data set gOD may occur as a result.

In one embodiment, the position of the deviation POS may define a target position for determination of the deformation rule DEF. The segmented 3D image data set segBD may be deformed for generating the corrected overlay data set corrID at least partially in the direction of the target position POS.

In the illustrated exemplary embodiment, the corresponding at least one landmark cLM may be determined in the segmented 3D image data set based on the target position POS and/or based on the at least one landmark LM in the visual representation of the overlay data set gOD. The at least one landmark LM may mark, for example, mapping of an orifice in the visual representation of the overlay data set gOD (e.g., in the portion of the segmented 3D image data set reg.segBD on the overlay data set OD). Further, the target position may mark an actual position of the at least one landmark LM in the visual representation of the overlay data set gOD.

If at least one reference landmark in the segmented 3D image data set reg.segBD is annotated on the at least one anatomical structure AS, the visual representation of the overlay data set gOD may have a visual representation (e.g., a mapping) of the at least one reference landmark. In the illustrated exemplary embodiment, the visual representation of the overlay data set may have, by way of example, two visual representations LM and LM2 of reference landmarks in the segmented 3D image data set reg.segBD. In one embodiment, the at least one landmark LM may be identified (DET-LM) based on the defined position of the deviation POS (e.g., based on a spatial distance from the position of the deviation POS).

In one embodiment, the deformation rule DEF may be determined such that at least part of the segmented 3D image data set reg.segBD, which part has the corresponding at least one landmark (e.g., the at least one reference landmark), is deformed. In one embodiment, the at least one landmark LM (e.g., the visual representation of the at least one reference landmark) may be deformed in the direction of the target position POS.

Figure 14:
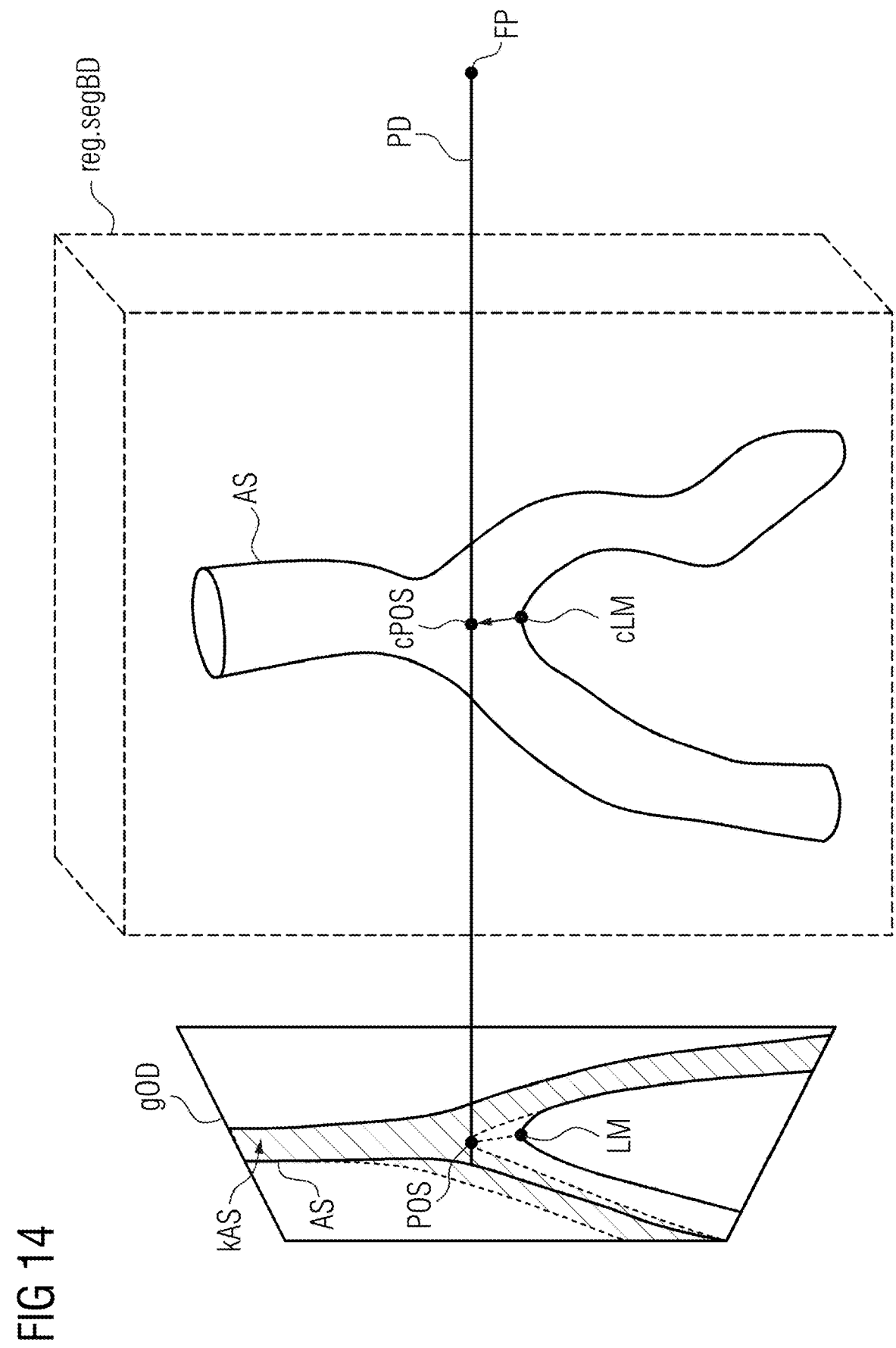
FIG. 14 shows a schematic representation of another embodiment of a method for identification of a corresponding position.

FIG. 14 schematically shows a further embodiment of the method for deformation correction. The position of the deviation POS may define a target position. Further, the corresponding position cPOS may define a corresponding target position in the segmented 3D image data set reg.segBD. Further, the deformation rule DEF may be determined such that at least part of the segmented 3D image data set reg.segBD is deformed in the direction of the corresponding target position cPOS. For example, the corresponding at least one landmark cLM, which may be, for example, at least one of the at least one reference landmark, may be deformed in the direction of the corresponding target position cPOS hereby.

In one embodiment, the corresponding target position may be determined in the segmented 3D image data set reg.segBD by back projection of the position of the deviation POS counter to the projection direction PD. The corresponding target position may also be determined as the intersection of the back projection direction, starting from the defined position of the deviation POS, with a reference plane. In one embodiment, the reference plane may be determined in that the back projection direction or the projection direction PD are normal to the reference plane and the reference plane has at least one of the at least one reference landmark. For example, the at least one of the at least one reference landmark may mark a center point of an orifice on the at least one anatomical structure AS. In one embodiment, the reference plane may have the center point of the orifice, which is marked by the at least one of the at least one reference landmark. In one embodiment, the corresponding target position may be determined explicitly based on the defined position of the deviation POS hereby.

Figure 15:
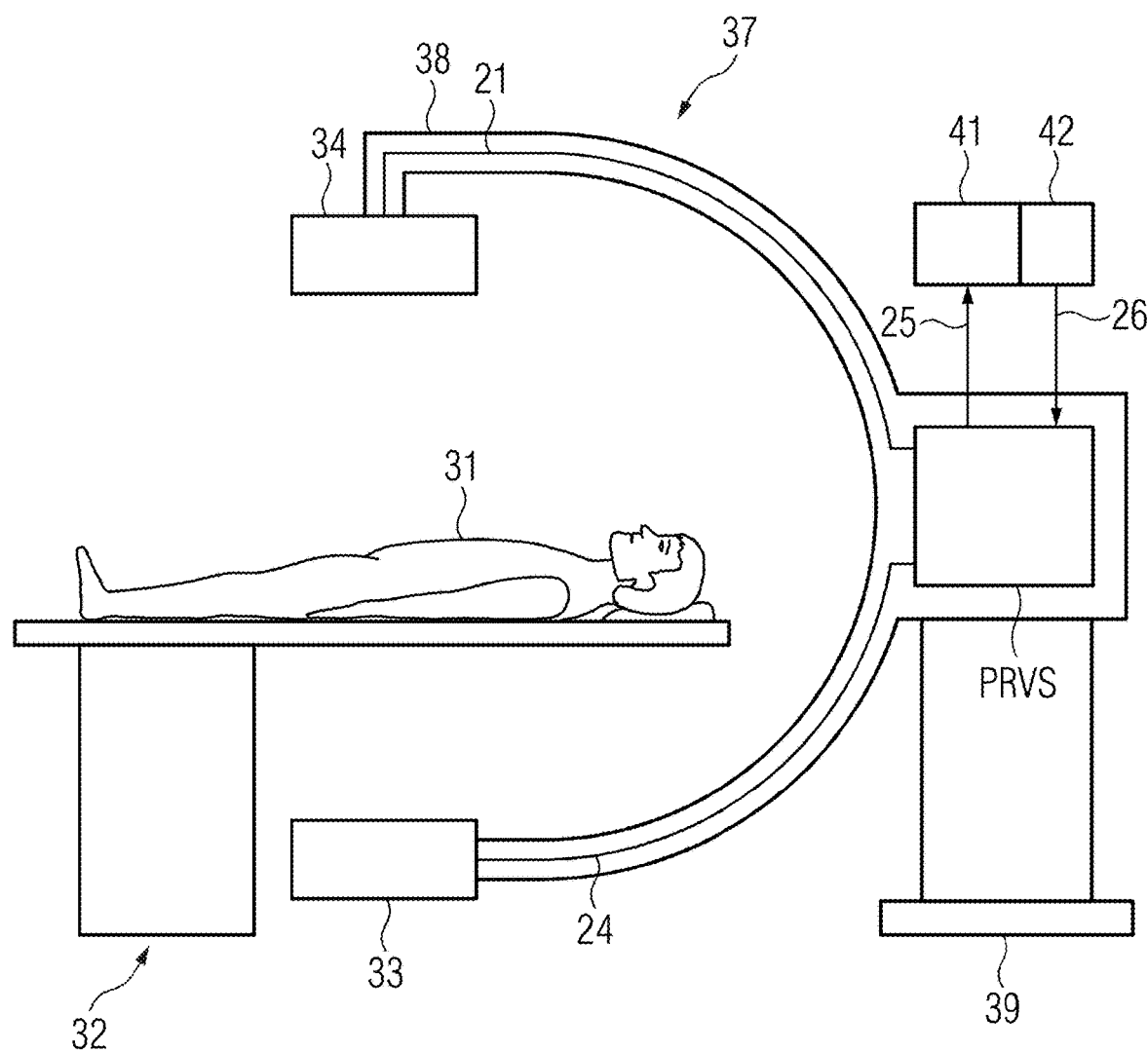
FIG. 15 shows a schematic representation of one embodiment of a medical C-arm X-ray apparatus.

FIG. 15 schematically illustrates, by way of example for a proposed medical imaging device, a medical C-arm X-ray apparatus 37. In one embodiment, the medical C-arm X-ray apparatus 37 may include one embodiment of a provision unit PRVS. The medical imaging device 37 (e.g., the proposed provision unit PRVS) is configured for carrying out a method of one or more of the present embodiments for deformation correction.

The medical C-arm X-ray apparatus 37 also includes, for example, a detector unit 34 and an X-ray source 33. For the acquisition of the preoperative image data set preBD and/or the image data intraBD, the arm 38 of the C-arm X-ray apparatus 37 may be mounted to move around one or more axes. Further, the medical C-arm X-ray apparatus 37 may include a movement device 39 that enables a movement of the C-arm X-ray apparatus 37 in the space.

For acquisition of the preoperative image data set preBD and/or the image data intraBD from the examination region of the examination object 31, arranged on a patient supporting device 32, the provision unit PRVS may send a signal 24 to the X-ray source 33.

The X-ray source 33 may then emit an X-ray beam (e.g., a cone beam and/or fan beam and/or parallel beam). When, after an interaction with the examination region of the examination object 31 to be mapped, the X-ray beam strikes a surface of the detector unit 34, the detector unit 34 may send a signal 21 to the provision unit PRVS. The provision unit PRVS may receive the preoperative image data set preBD and/or the image data BD (e.g., based on the signal 21).

Further, the medical C-arm X-ray apparatus 37 may include an input unit 42 (e.g., a keyboard and/or a display unit 41, such as a monitor and/or display). In one embodiment, the input unit 42 may be integrated in the display unit 41 (e.g., in the case of a capacitive input display). Control of the medical C-arm X-ray apparatus 37 (e.g., of the method for deformation correction) may be enabled by a user input at the input unit 42. For example, the visual representation of the overlay data set gOD may be displayed by the display unit 41. The user may define the position of the deviation POS using the input unit 42. The input unit 42 may send, for example, a signal 26 to the provision unit PRVS for this.

Further, the display unit 41 may be configured to display information and/or visual representations of information of the medical imaging device 37 and/or the provision unit PRVS and/or further components. For this, the provision unit PRVS may send, for example, a signal 25 to the display unit 41. For example, the display unit 41 may also be configured to display the visual representation of the corrected overlay data set corrOD and/or the image data intraBD and/or the segmented 3D image data set segBD.

The schematic representations contained in the described figures do not depict any kind of scale or size ratio.

The methods described in detail above and the illustrated devices are merely exemplary embodiments that may be modified in a wide variety of ways by a person skilled in the art without departing from the scope of the invention. Further, use of the indefinite article "a" or "an" does not preclude the relevant features from also being present a number of times. Similarly, the terms "unit" and "element" do not preclude the relevant components from including a plurality of cooperating sub-components that may optionally also be spatially distributed.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for deformation correction, the method comprising:
   receiving a preoperative three-dimensional (3D) image data set from an examination region of an examination object;
   generating a segmented 3D image data set, the generating of the segmented 3D image data set comprising segmenting at least one anatomical structure in the preoperative 3D image data set;
   acquiring image data from the examination region, wherein a medical object is arranged in the examination region;
   identifying a mapping of the medical object in the image data;
   registering the segmented 3D image data set with the image data;
   generating an overlay data set based on the segmented 3D image data set and the image data;
   displaying, by a display unit, a visual representation of the overlay data set;
   defining a position of a deviation between the image data and the segmented 3D image data set in the visual representation of the overlay data set;
   determining a deformation rule based on the defined position of the deviation and the identified mapping of the medical object such that the deviation between the image data and the segmented 3D image data set is reduced;
   generating a corrected overlay data set, the generating of the corrected overlay data set comprising applying the deformation rule to the segmented 3D image data set; and
   providing the corrected overlay data set.

2. The method of claim 1, wherein the method is carried out repeatedly beginning from the displaying of the visual representation of the overlay data set for the generating of the corrected overlay data set, through to an occurrence of a termination condition,
   wherein the corrected overlay data set is provided as an overlay data set in the displaying of the visual representation of the overlay data set.

3. The method of claim 1, wherein the segmented 3D image data set is generated having a deformable model of the at least one anatomical structure, and
   wherein the deformation rule is applied to the deformable model.

4. The method of claim 3, wherein registering the segmented 3D image data set with the image data comprises an adjustment of the deformable model in the segmented 3D image data set.

5. The method of claim 1, wherein generating the segmented 3D image data set comprises an annotation of at least one reference landmark on the at least one anatomical structure in the segmented 3D image data set.

6. The method of claim 5, wherein defining the position of the deviation comprises determining a corresponding at least one landmark in the segmented 3D image data set based on the defined position of the deviation.

7. The method of claim 6, wherein one or more reference landmarks of the at least one reference landmark is determined as the corresponding at least one landmark.

8. The method of claim 6, wherein defining the position of the deviation further comprises an identification of at least one landmark in the visual representation of the overlay data set based on the defined position of the deviation, and
wherein the corresponding at least one landmark is determined based on the at least one landmark.

9. The method of claim 1, wherein defining the position of the deviation comprises determining a corresponding at least one landmark in the segmented 3D image data set based on the defined position of the deviation.

10. The method of claim 1, wherein the position of the deviation defines a target position for the determination of the deformation rule in the determining of the deformation rule.

11. The method of claim 8, wherein the position of the deviation defines a target position for the determination of the deformation rule in the determining of the deformation rule, and
wherein the deformation rule is determined such that the at least one landmark is deformed in a direction of the target position.

12. The method of claim 6, wherein the identification of the at least one landmark in the visual representation of the overlay data set and the at least one landmark corresponding therewith in the segmented 3D image data set takes place by applying a trained function to input data,
wherein the input data is based on the defined position of the deviation, of the visual representation of the overlay data set, the segmented 3D image data set, and the image data, and
wherein at least one parameter of the trained function is based on a comparison of at least one training landmark with at least one comparison landmark and a comparison of the at least one training and comparison landmark corresponding therewith, respectively.

13. The method of claim 1, wherein defining the position of the deviation takes place via a user input using an input unit.

14. The method of claim 1, wherein the overlay data set has an item of distance information relating to the deviation between the segmented 3D image data set and the image data, and
wherein defining the position of the deviation is also based on the distance information.

15. The method of claim 1, wherein determining the deformation rule comprises determining a position corresponding with the defined position of the deviation in the segmented 3D image data set by a back projection.

16. The method of claim 15, wherein the position of the deviation defines a target position,
wherein the corresponding position defines a corresponding target position in the segmented 3D image data set,
wherein the deformation rule is determined such that at least part of the segmented 3D image data set is deformed in the direction of the corresponding target position.

17. The method of claim 1, wherein determining the deformation rule comprises determining the deformation rule also based on a material property of the medical object, an operating parameter of the medical object, a form of the medical object, a tissue parameter of the examination object, a physiological parameter of the examination object, or any combination thereof.

18. The method of claim 1, wherein the corrected overlay data set is generated by applying a further trained function to further input data,
wherein the further input data is based on the defined position of the deviation, the segmented 3D image data set, and the image data, and
wherein at least one parameter of the further trained function is based on a comparison of a corrected training overlay data set with a corrected comparison overlay data set.

19. A method for providing a trained function, the method comprising:
receiving a preoperative three-dimensional (3D) training image data set from an examination region of an examination object;
generating a segmented 3D training image data set, the generating of the segmented 3D training image data set comprising segmenting at least one anatomical structure in the preoperative 3D training image data set;
receiving training image data from the examination region, wherein a medical object is arranged in the examination region;
registering the segmented 3D training image data set with the training image data;
generating a training overlay data set based on the segmented 3D training image data set and the training image data;
generating a visual training representation of the training overlay data set;
determining a training position of a deviation between the training image data and the segmented 3D training image data set in the visual training representation of the training overlay data set;
identifying at least one comparison landmark in the visual training representation of the training overlay data set based on the defined training position of the deviation;
determining an at least one comparison landmark corresponding with the at least one comparison landmark in the segmented 3D training image data set;
identifying at least one training landmark in the visual training representation of the training overlay data set and at least one training landmark corresponding therewith in the segmented 3D training image data set by applying the trained function to input data, wherein the input data is based on the defined training position of the deviation, the visual training representation of the training overlay data set, the segmented 3D training image data set, and the training image data;
adjusting at least one parameter of the trained function based on a comparison of the at least one training landmark with the at least one comparison landmark and a comparison of the at least one training and comparison landmark corresponding therewith, respectively; and
providing the trained function.

20. A method for providing a further trained function, the method comprising:
receiving a preoperative three-dimensional (3D) training image data set from an examination region of an examination object;
generating a segmented 3D training image data set, the generating of the segmented 3D training image data set comprising segmenting at least one anatomical structure in the preoperative 3D training image data set;

receiving training image data from the examination region, wherein a medical object is arranged in the examination region;

identifying a mapping of the medical object in the training image data;

registering the segmented 3D training image data set with the training image data;

generating a training overlay data set based on the segmented 3D training image data set and the training image data;

generating a visual training representation of the training overlay data set;

defining a training position of a deviation between the training image data and the segmented 3D training image data set in the visual training representation of the training overlay data set;

determining a training deformation rule based on the defined training position of the deviation and the identified mapping of the medical object such that the deviation between the training image data and the segmented 3D training image data set is reduced;

generating a corrected comparison overlay data set, the generating of the corrected comparison overlay data set comprising applying the training deformation rule to the segmented 3D training image data set;

generating a corrected training overlay data set, the generating of the corrected training overlay data set comprising applying the further trained function to further input data, wherein the further input data is based on the defined training position of the deviation, the segmented 3D training image data set, and the training image data;

adjusting at least one parameter of the further trained function based on a comparison between the corrected training overlay data set and the corrected comparison overlay data set; and providing the further trained function.

* * * * *